United States Patent [19]

Takahashi et al.

[11] Patent Number: 4,798,084

[45] Date of Patent: Jan. 17, 1989

[54] MEASURING DEVICE FOR MEASURING A FUEL INJECTION QUANTITY

[75] Inventors: Takeshi Takahashi; Naoyuki Tsuzuki; Hidetaka Nohira, all of Toyota; Yukimitsu Omori; Akio Takamura, both of Tokyo, all of Japan

[73] Assignees: Toyota Jidosha Kabushiki Kaisha, Toyota; Ono Sokki Co., Ltd., Tokyo, both of Japan

[21] Appl. No.: 939,981

[22] Filed: Dec. 9, 1986

[30] Foreign Application Priority Data

| Dec. 9, 1985 | [JP] | Japan | 60-276537 |
| Dec. 9, 1985 | [JP] | Japan | 60-276538 |
| Dec. 13, 1985 | [JP] | Japan | 60-281425 |
| Dec. 13, 1985 | [JP] | Japan | 60-281426 |
| Dec. 26, 1985 | [JP] | Japan | 60-298212 |
| Dec. 26, 1985 | [JP] | Japan | 60-298213 |
| Jun. 7, 1986 | [JP] | Japan | 61-132198 |

[51] Int. Cl.⁴ .................................. G01M 15/00
[52] U.S. Cl. .................................. 73/119 A
[58] Field of Search .................. 73/119 A, 168, 198

[56] References Cited

U.S. PATENT DOCUMENTS

| 4,086,815 | 5/1978 | Asano et al. | 73/721 |
| 4,453,403 | 6/1984 | Bussey et al. | 73/119 A |
| 4,488,429 | 12/1984 | Ito | 73/119 A |
| 4,546,648 | 10/1985 | Abt et al. | 73/119 A |

FOREIGN PATENT DOCUMENTS

| 371601 | 7/1976 | Fed. Rep. of Germany . |
| 3240622 | 11/1983 | Fed. Rep. of Germany . |
| 54-9505 | 4/1979 | Japan . |
| 55-131723 | 10/1980 | Japan . |
| 57-170358 | 10/1982 | Japan . |
| 58-72673 | 4/1983 | Japan . |
| 58-731818 | 5/1983 | Japan . |
| 59-88624 | 5/1984 | Japan . |
| 61-1862 | 1/1986 | Japan . |
| 61-38523 | 2/1986 | Japan . |
| 61-40458 | 2/1986 | Japan . |
| 2105407 | 3/1983 | United Kingdom . |

OTHER PUBLICATIONS

Published Examined Patent Application No. 54-9505 (Japan).
Published Unexamined Japanese Patent Appln. No. 61-40458.

Primary Examiner—Jerry W. Myracle
Attorney, Agent, or Firm—Cushman, Darby & Cushman

[57] ABSTRACT

A measuring device for measuring a fuel injection quantity comprising fuel volume sensing means including a fuel injection chamber connected to a fuel injection valve and receiving the fuel injection quantity therefrom, a back pressure chamber which faces the fuel injection chamber, bulkhead means located between the fuel injection chamber and the back pressure chamber as an intercept therebetween and responsive to the fuel injection quantity for generating a displacement, sensing means for sensing the displacement of the bulkhead means, pressure means for holding a pressure of the back pressure chamber to be of a constant value, fuel injection quantity computing means responsive to the sensing means for determining a fuel injection quantity, discharging means including fuel discharging means for discharging the injected fuel quantity from the fuel injection chamber to its exterior, discharging quantity computing means responsive to the fuel injection quantity computing means for computing a discharged quantity, and discharge control means responsive to the discharging quantity computing means for controlling the fuel discharging means so as to control the discharged quantity.

13 Claims, 33 Drawing Sheets

DISCHARGE
VALVE 7

DISCHARGE
VALVE 8

DISCHARGE
VALVE 9

DISCHARGE
VALVE 10

TIME →

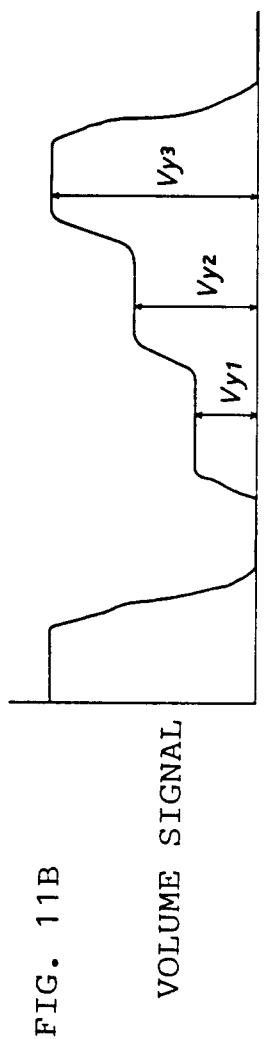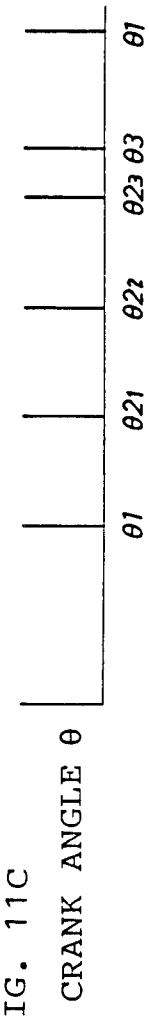
FIG. 11A
STATE OF DISCHARGE VALVE
FIG. 11B
VOLUME SIGNAL
FIG. 11C
CRANK ANGLE θ

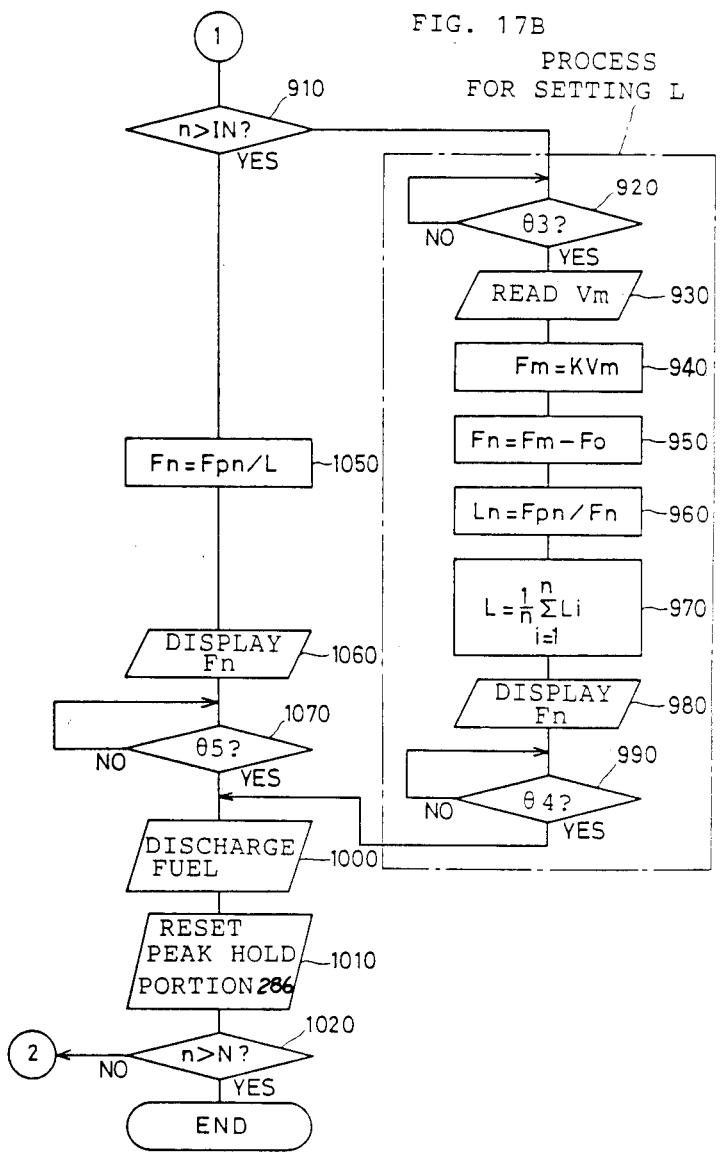

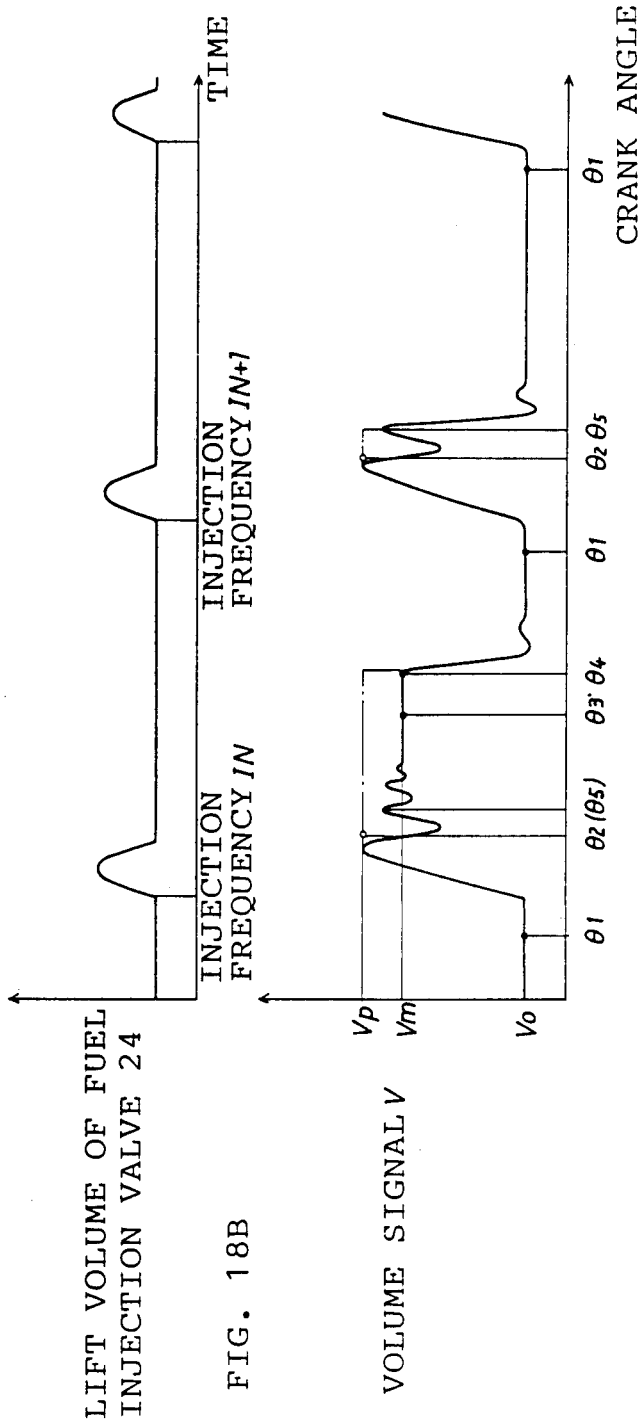

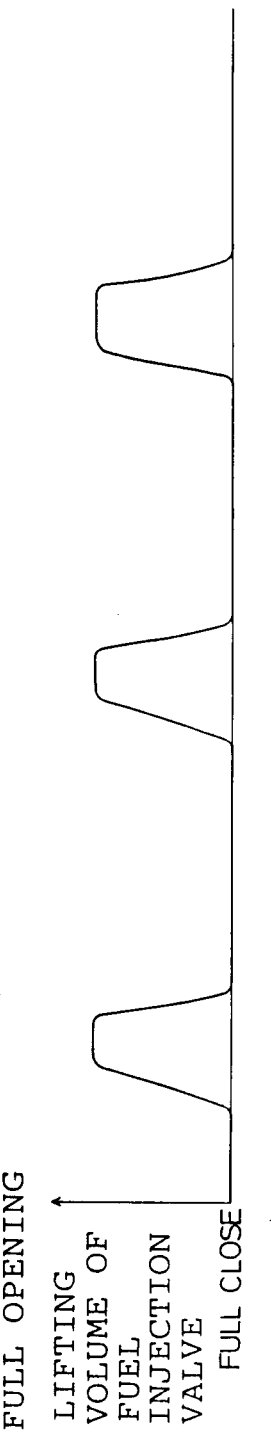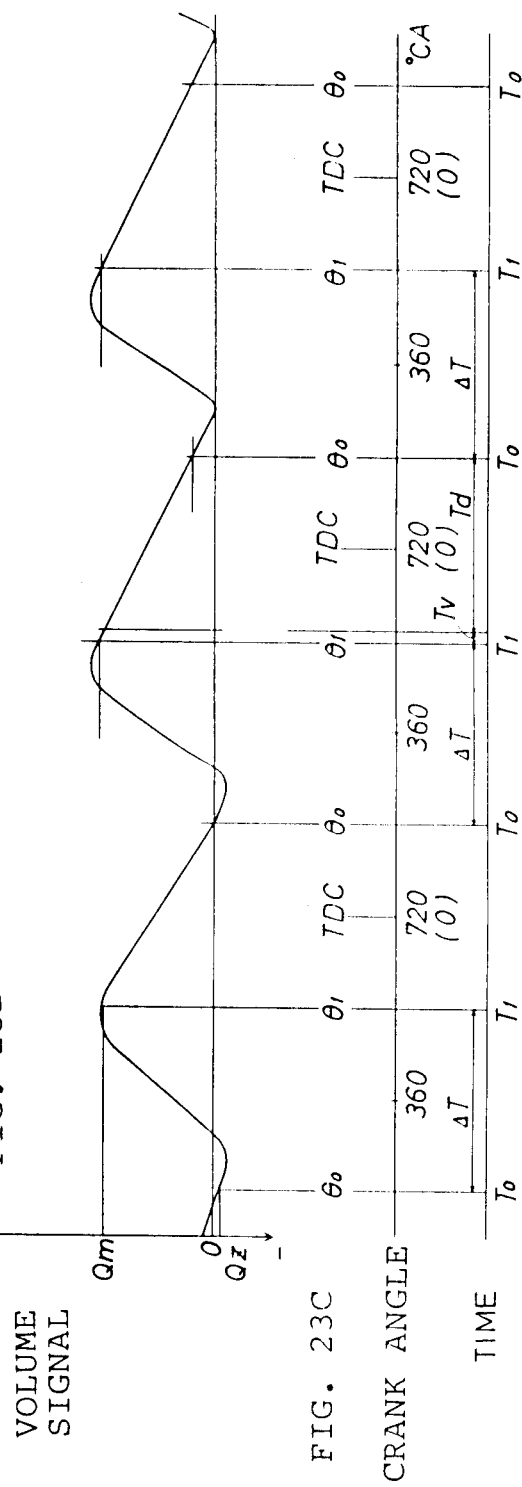

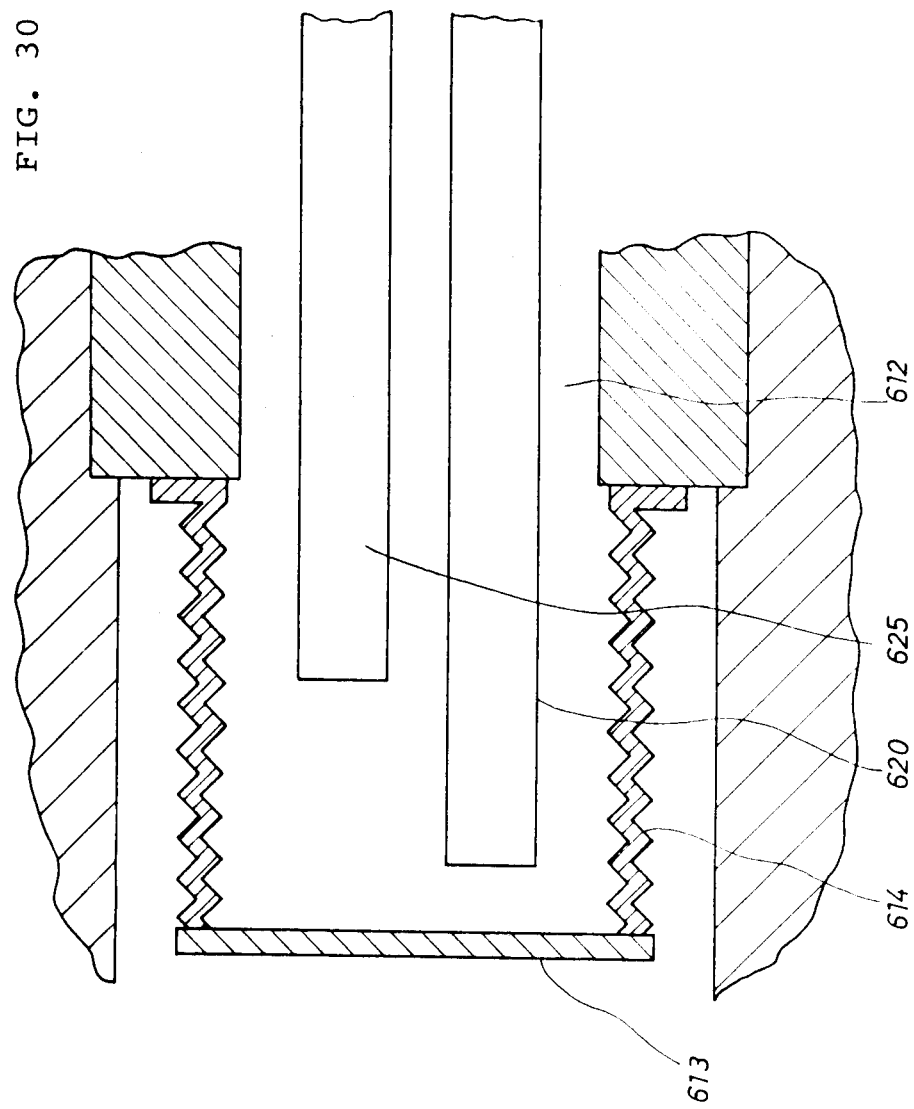

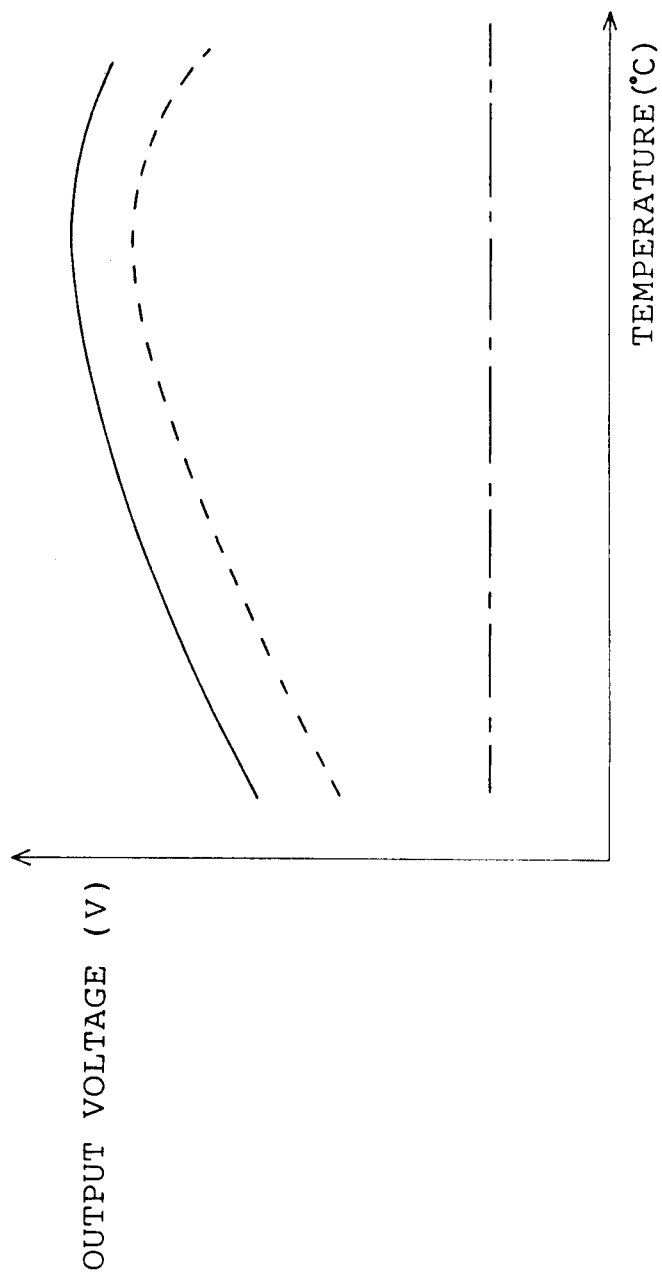

MEASURING DEVICE FOR MEASURING A FUEL INJECTION QUANTITY

BACKGROUND OF THE INVENTION

The present invention relates to a measuring device for measuring a fuel injection quantity under the conditions corresponding to a real fuel injection.

When fuel is supplied by fuel injection to a diesel engine or a gasoline engine which is provided with an electronic controlled fuel injection system, a measuring device for measuring the fuel injection quantity is required to be developed, planned or examined to minutely control injection fuel quantity. To meet these requirements, various kinds of measuring devices for measuring the fuel injection quantity have been invented. Three examples are hereinafter described.

A piston-type measuring device for measuring the fuel injection quantity has been used in which a cylinder having a piston activated in a given direction is connected to the injection side of a fuel injection valve, thereby detecting a displacement d of the piston and measuring the fuel injection quantity by multiplication of the above-mentioned d and a sectional area of the cylinder S (S×d).

A pressure-type measuring device for measuring the fuel injection quantity has been used in which a fuel is injected into a closed vessel (quantity Vo) under a pressure corresponding to a pressure of a combustion chamber and the like, which is called a back pressure, thereby calculating the quantity of injected fuel Vb as follows:

$$dVb/dt = (Vo/E) \times (dP/dT)$$

An accumulating-type measuring device for measuring the fuel injection quantity has been used in which a fuel quantity injected for a predetermined period of time is detected by multiplication. The fuel quantity for one fuel injection is calculated by dividing the above-mentioned fuel quantity with the injection frequency.

Though the above three measuring apparatuses are well-known, they have some shortcomings, described below, as well as some strong points.

With respect to the piston-type measuring device for measuring the fuel injection quantity in which the injected fuel quantity is calculated by the displacement d and a sectional area of a cylinder S, the sectional area is required to be decreased to improve the resolving power of the measurement. When a minute fuel quantity such as 0.1 mm$^3$ is to be calculated precisely, however, it becomes very difficult to increase the maximum fuel quantity. Accordingly, it is impossible to measure the fuel quantity precisely within the ability of the fuel injection system, for example, 0–100 mm$^3$/stroke.

When a piston is applied, overshoot is generated in measurement due to inertia of the piston so that the precise measurement of the fuel injection quantity is impossible until overshoot ceases. Accordingly, response of the measurement is slow so that the piston-type measuring device is unable to be applied to the measurement of the fuel injection quantity under the conditions that an internal combustion engine is driven at a high speed.

Since a piston is activated by a spring, it is very difficult to maintain the pressure (back pressure) regularly inside a cylinder where the fuel injection is carried out, or to determine the pressure freely. Accordingly, the experiment and measurement are difficult based upon the condition of a real fuel injection.

Furthermore, in the case that the piston is used, there is slide resistance to the piston. The resistance makes it difficult to measure the fuel injection quantity precisely. That is, a seal becomes bad when the resistance is decreased, so that leakage of fuel increases when slide resistance is reduced.

On the other hand, the pressure-type measuring device for measuring the fuel injection quantity calculates fuel injection volume by pressure variation inside a vessel so that accurate measurement is difficult when some air bubbles are mixed. This is because a pressure wave caused by fuel injection is reflected on the air bubble in the vessel and generates a reflected pulse as an error of measurement.

Furthermore, the accumulating-type measuring device for measuring the fuel injection quantity calculates one fuel injection quantity from the fuel quantity that is accumulated within a specified period of time. That makes it difficult to measure the variation of the fuel injection quantity that exerts a large influence to the dynamic characteristic of a fuel injection system, such as the variation of the roughness of the internal combustion engine, for example. Also, according to this measuring device, the accumulation number (stroke number) of the fuel injection quantity is required to be enlarged so as to improve the accuracy of a measurement. Especially, in the case that fuel injection is exercised for a low rotation of the internal combustion engine, it requires a long time to measure and adjust the fuel injection quantity. This problem causes low productivity of a fuel injection system.

SUMMARY OF THE INVENTION

The object of the present invention is to provide a measuring device for measuring a fuel injection quantity which has high accuracy, wide range and a quick response of measurement at the same time, and which grasps capacitance of the fuel injection system quantitatively for measuring the fuel injection quantity correctly.

The measuring device for measuring the fuel injection quantity in accordance with the present invention:

fuel volume sensing means which has a fuel injection chamber connected to a fuel injection valve for receiving the fuel quantity therefrom, a back pressure chamber provided which faces the fuel injection chamber, bulkhead means located between the fuel injection chamber and the back pressure chamber as an intercept between them and responsive to the fuel injection quantity for generating a displacement, sensing means for sensing the displacement of the bulkhead means, and pressure means for holding a pressure of the back pressure chamber to be of a constant value, fuel injection quantity computing means responsive to the sensing means for determining a fuel injection quantity, discharging means having fuel discharging means for discharging the injected fuel quantity from the fuel injection chamber to its exterior, discharging quantity computing means responsive to the injection quantity computing means for computing a discharged quantity, and discharge control means responsive to the discharging quantity computing means for controlling the fuel discharging means to control the discharged quantity.

The measuring device, according to the present invention, can improve efficiency of a fuel injection pump and shorten the adjustment period so that productivity is greatly improved.

The measuring device of the present invention calculates the fuel injection quantity by displacement of a diaphragm both before and after the fuel injection. This causes an accurate measurement of the fuel injection quantity even when the fuel output is separated by a fuel discharging means, for example, in the case that the fuel discharging means with low accuracy is applied, or the differential pressure between the place where fuel is charged and a fuel injection chamber is variable. The accuracy is scarcely effected after the discharge when the diaphragm is unable to return to its predetermined place because of delayed response of the diaphragm, or when the diaphragm drifts because of the variation of fuel temperature and the like. Fuel is discharged after the fuel injection is exercised a predetermined number of times, and the injection quantity is measured at every injection, so that the measurement is not limited by a minimum discharge quantity of the fuel discharge means and so that even a very minute quantity of fuel injection can be detected.

The measurement device of the present invention can miniaturize construction and improve response and accuracy of measurement within a wide range of the fuel injection quantity. Furthermore, it can measure the characteristics of the fuel injection device so that the reliability of measurement is improved.

The fuel volume sensing means, which converts fuel injection quantity into the displacement of the diaphragm and detects it, is provided with the fuel injection chamber, the back pressure chamber and the diaphragm which separates the above two chambers. Volume of the fuel injection chamber, diameter of the diaphragm and the like are to be determined according to maximum of measured fuel injection quantity.

The displacement sensing means which detects the displacement of the diaphragm can be constructed to detect the displacement of the diaphragm (usually at the center) directly by a mechanical sensor, an optical sensor such as a differential transformer, a potentiometer and the like. It can be also constructed to detect electrically and magnetically by variation of electrostatic capacitance between electrodes using a diaphragm made of a metallic film and the like, or by variation of mutual inductance with a coil. When it is constructed as the latter, accuracy of measurement is improved, not only because it is a non-contact style, but also because the displacement of the whole diaphragm is reflected.

Discharge valves as the fuel discharging means can be constructed in any way to discharge fuel in the fuel injection chamber into the discharge chamber. For example, the valves can be connected with the discharge chamber to discharge fuel therein. A delivery pipe connected with the fuel injection chamber, which is provided inside the discharge chamber, can be provided with more than two discharge valves. The opening area of these valves can be the same or different from each other.

Furthermore, the pressure differential between the back pressure chamber and the discharge chamber can be fixed. For that purpose, the back pressure chamber and the discharge chamber can be connected by a pipe with a differential pressure regulator, or each pressure of the back pressure chamber and the discharge chamber may be detected, and a solenoid valve or the like may be controlled to fix pressure differential between the two chambers.

The fuel injection quantity computing means which computes the fuel injection quantity by the displacement of the diaphragm can be constructed so that the displacement of the diaphragm corresponding to the volume change of the fuel injected into the chamber is previously calculated experimentally and theoretically, and the result of that calculation is referred to upon operation. The fuel injection quantity computing means can be provided with a discrete circuit construction when the relationship between the displacement of the diaphragm and the fuel injection quantity is linear, quadratic and so on. On the other hand, it can be provided with a logic operation circuit to calculate the fuel injection quantity by a table when the above relationship is complicated.

The fuel discharging means, which discharges fuel injected into the fuel injection chamber, opens the valves provided in the fuel injection chamber after the fuel injection in response to the fuel injection quantity which is calculated by the fuel injection quantity detection means. Accordingly, it can be provided with a discrete or logic operation circuit construction, or both.

In the measuring device for measuring the fuel injection quantity of the present invention, the quantity of fuel injected in the fuel injection chamber of the fuel volume sensing means is detected by the displacement of the diaphragm which separates the fuel injection chamber and the back pressure chamber. The back pressure chamber of the measuring device for measuring the fuel injection quantity is pressed to keep predetermined pressure, and it is connected to the fuel injection chamber by the diaphragm. The differential pressure of this back pressure chamber and the discharge chamber can be fixed.

Accordingly, the measuring device for measuring the fuel injection quantity of the present invention detects the displacement of the above diaphragm in response to the fuel injection quantity by the displacement detection means, and calculates the fuel injection quantity by the fuel injection quantity detection means. Also, it opens the valves in response to fuel injection quantity operated upon after fuel injection ceased so that it discharges fuel of the same quantity as the fuel injection quantity exactly to decrease volume of the fuel injection chamber to the level before the fuel injection, and it continues to measure the exact fuel injection quantity.

The back pressure chamber is kept under a predetermined pressure. For that purpose, a regulator with a high response and a differential pressure valve and the like can be provided at the pressure system on the side of the back pressure chamber, or the pressure of a safety valve can be set and kept constant in appearance by a low modulus of volume elasticity of air part with a predetermined volume.

In another modification of the embodiment, the measuring device of the present invention detects the displacement quantities of the diagram both before and after the fuel injection to detect the difference thereof as the relative displacement difference. The fuel injection quantity is calculated in response to the above relative difference by the fuel injection quantity computing means, and the fuel discharge means discharges fuel of the quantity in response to the fuel injection quantity out of the fuel injection chamber after the fuel injection. Accordingly, the measuring device of the present invention measures the fuel injection quantity by keeping the pressure of the fuel injection chamber constant, even when the condition of the fuel injection chamber is the same as that before fuel injection.

In another modification of the embodiment, the fuel injection quantity calculated by the fuel injection quantity computing means is amended based upon the displacement of the diaphragm before the fuel injection by the discharge fuel correcting means, which is set as a discharge. The discharge controlling means controls the discharge fuel means to discharge the injected fuel out of the fuel injection chamber so that the displacement of the diaphragm before the fuel injection is controlled at a predetermined quantity.

In another modification of the embodiment, the fuel injection quantity computing means operates the fuel injection quantity by peak value of the displacement of the diaphragm which is provided at the fuel volume sensing means. The volume of the fuel injection chamber increases much in a short period of time upon fuel injection therein so that the displacement of the diaphragm repeats overshoot and undershoot which decrease for a certain period. It has been proved that with respect to the diaphragm, natural frequency of damped vibration, damping factor and ratio against steady-state value at a peak is determined by various factors of the measurement system in the fuel volume sensing means, for example, a shape and construction of the fuel injection chamber, or kind of fuel. On this account, the fuel injection quantity can be operated based upon the peak value of the displacement of the diaphragm which is detected by the displacement sensing means upon fuel injection. A discrete circuit provided with a peak-hold circuit, or a logic operation circuit is proposed as the above fuel injection quantity computing means.

The fuel discharge need not be exercised at every fuel injection; it is proposed at predetermined intervals of the fuel injection.

The measuring device for measuring the fuel injection quantity with the above construction thus detects fuel quantity injected into the fuel injection chamber of the fuel volume sensing means by the displacement of the diaphragm provided between the fuel injection chamber and the back pressure chamber. The back pressure chamber of the fuel volume sensing means is kept under a constant pressure and is connected with the fuel injection chamber by the diaphragm so that the pressure of the fuel injection chamber does not change even when fuel is injected from a fuel injection valve into the fuel injection chamber though the diaphragm displaces in response to the volume of the injected fuel. The displacement sensing means of the present invention detects the fuel injection quantity based upon the detected peak value of the displacement of the diaphragm after fuel injection by the fuel injection quantity computing means. The fuel discharging means discharges fuel corresponding to the quantity of injected fuel immediately after fuel injection quantity is measured.

In another modification, the fuel discharging means, which is provided with a discharge control means, discharges fuel disposed in the fuel injection chamber. A steady-flow valve, a throttle valve such as a needle valve which can vary an opening area, a variable orifice or a construction which varies differential pressure with the fuel injection chamber and the like are proposed as the discharge control means.

The fuel discharge sensing means, which detects the quantity of fuel discharged by the above fuel discharging means, may basically have the construction in which the fuel discharge is detected as a cumulative value of flow adjusted by the discharge control means within a predetermined period of time. When the discharge control means is a mere throttle valve and the like, flow within a predetermined period of time is calculated by differential pressure before and after the fuel injection, opening area, flow coefficient, fuel density and the like.

The fuel injection quantity computing means, in which the displacement of the diaphragm is detected both before and after the fuel injection, calculates the fuel injection quantity based upon a relative difference between the above two displacements. Furthermore, fuel is discharged, according to the quantity of the injected fuel, from the fuel injection chamber by the fuel discharge means after the fuel injection is finished. The volume change of the fuel injection chamber can be operated referring to the displacement of the diaphragm against volume of the fuel injection chamber which was previously calculated experimentally or logically. The fuel injection quantity computing means can be provided with a construction of a discrete circuit when the relationship between the displacement of the diaphragm and the fuel injection quantity is linear, quadratic and so on. On the other hand, it can be provided with a logic operation circuit to calculate fuel injection quantity by a table when the above relationship is complicated. Accordingly, the discharge upon fuel injection is added to the volume change of the fuel injection chamber calculated above so that the real fuel injection quantity is calculated.

In the discharge control means which controls the flow regulating means of the fuel discharging means based upon the fuel injection quantity calculated by the above fuel injection quantity computing means, when the flow regulating means is a throttle valve and the like, the opening area of the throttle valve is varied. When the discharge control means is constructed to adjust flow by the differential pressure, the displacement is controlled by adjusting the differential pressure.

The discharge control means can be provided with a construction of a discrete circuit or a logic operation circuit similar to the fuel injection quantity computing means. Furthermore, it can be constructed as a logic operation circuit together with the fuel injection quantity computing means.

The measuring device for measuring the fuel injection quantity of the present invention further detects volume change of the fuel injection chamber of the fuel volume sensing means upon fuel injection therein by means of the displacement of the diaphragm provided between the fuel injection chamber and the back pressure chamber. The fuel injected into the fuel injection chamber is discharged outward by the fuel discharge means, the displacement of which is adjustable by the flow regulating means and detected by the fuel discharge quantity detection means. Accordingly, the measuring device of the present invention calculates the fuel injection quantity by means of the fuel injection quantity operation means, based upon the volume change of the fuel injection chamber upon fuel injection, and the fuel quantity detected by the fuel discharge detection means. Furthermore, the measuring device controls the discharge control means of the fuel discharge means, by means of the discharge controlling means, based upon the fuel injection quantity calculated above, so that the volume of the fuel injection chamber recovered is similar to the predetermined volume just before every fuel injection to bring about the condition for continuing measurement of the fuel injection quantity.

In another modification of the embodiment, the fuel injection chamber injects fuel by means of a fuel injection valve. The fuel injection chamber is usually filled with fuel, the volume of which is desired to be determined in response to the maximum of the fuel injection quantity upon measurement.

The discharging means discharges fuel inside the fuel injection chamber outward. For example, it may have the construction in which an electronic valve connected to the fuel injection chamber opens corresponding to the period of time for circulation, or in which fuel of the same quantity as the fuel injection quantity is discharged at a predetermined period so that a serial measurement of the fuel injection quantity is possible. The fuel discharge need not be exercised at every fuel injection, it may be proposed at predetermined intervals of the fuel injection.

The back pressure chamber faces to the fuel injection chamber and is kept under a predetermined pressure, for example, by activating bulkheads provided between the fuel injection chamber and the back pressure chamber in the direction of the fuel injection chamber with elasticity thereof or the pushing pressure of a spring. It may also be kept by a construction in which a pressure system on the side of the back pressure chamber is provided with a regulator with a high response or a differential measure regulator. Furthermore, it can be kept by a low modulus of elasticity of air part with a predetermined volume.

A buffer agent, which is provided at a predetermined position in the fuel injection chamber facing the back pressure chamber, has a communicating hole. For example, it is made of porous material such as sintered metal, ceramic and the like. It also can be a plate-shaped means with a restriction hole penetrating therethrough.

Bulkheads intercept the fuel injection chamber and the back pressure chamber, and they change in response to the fuel injection quantity. They are made of, for example, bellows of iron or synthetic resin which deform only slightly.

The displacement sensing means detects at least the displacement of the bulkheads. It is constructed by, for example, a displacement converter of a high-frequency oscillating type which has a detection coil and varies inductance and loss of the above coil when a metallic material approaches, so that the displacement of the bulkhead is detected without touching the bulkheads. It may also be constructed by first and second detection parts. The first detection part is provided at he position where the result of the detection changes corresponding to the displacement of the bulkhead. The second detection part has a construction similar to that of the above first detection part, and it is provided where the result of the detection does not change at least corresponding to the displacement of the bulkhead. In that case, it is possible to amend an error in the result of measurement which is caused by an environmental change.

The measuring device for measuring the fuel injection quantity of the present invention detects the quantity of fuel injected into the fuel injection chamber by the fuel injection valve based upon the displacement of the bulkhead provided between the fuel injection chamber and the back pressure chamber. That is, the dynamic shock which follows the fuel injection is decreased by the buffer agent so that the volume increases statically in response to the fuel injection quantity of the fuel injection chamber. On the other hand, the back pressure chamber is kept under a predetermined pressure so that the pressure in the fuel injection chamber does not change, and the bulkhead displaces in response to the above volume increase. The displacement thereof is detected by the displacement sensing means. The above displacement has a predetermined relationship with the fuel injection quantity so that fuel injection quantity is measured by the above displacement quantity. The displacement means displaces fuel of the quantity corresponding to the fuel injection quantity at every fuel injection or predetermined intervals of fuel injection. On this account, the volume of the fuel injection chamber decreases to the initial volume, and the bulkheads return to an initial position. The fuel injection and the displacement are repeated alternately as described above so that serial measurement of the fuel injection quantity is possible.

Accordingly, the measuring device of the present invention translates the fuel injection quantity in the fuel injection chamber, which is kept under a steady pressure, into the displacement of the bulkheads by means of the buffer agent so that the displacement detection means can detect the above displacement. The present invention achieves this technical purpose with the constructions described above.

These and other objects and advantages of the invention will become apparent upon reference to the following specification, attendant claims, and drawings.

BRIEF DESCRIPTION OF THE DRAWINGS

FIGS. 11A-11C are timing charts which show a timing of measurement in the fourth embodiment of the present invention;

FIGS. 17A and 17B are flow charts which show a process of a measuring device for measuring a fuel injection quantity in the sixth embodiment of the present invention;

FIGS. 18A and 18B are timing charts which show timing of measurement in the sixth embodiment of the present invention;

FIGS. 23A–23C are timing charts which show an example of control in the seventh embodiment;

FIG. 30 is a partially sectional view of another modification of the eight embodiment; and FIG. 31 is a graph which shows the relationship between output voltage and temperature according to the eighth embodiment.

DETAILED DESCRIPTION OF THE PREFERRED EMBODIMENTS

A first embodiment of the invention will be hereinafter described in detail with reference to drawings.

Figure 1:
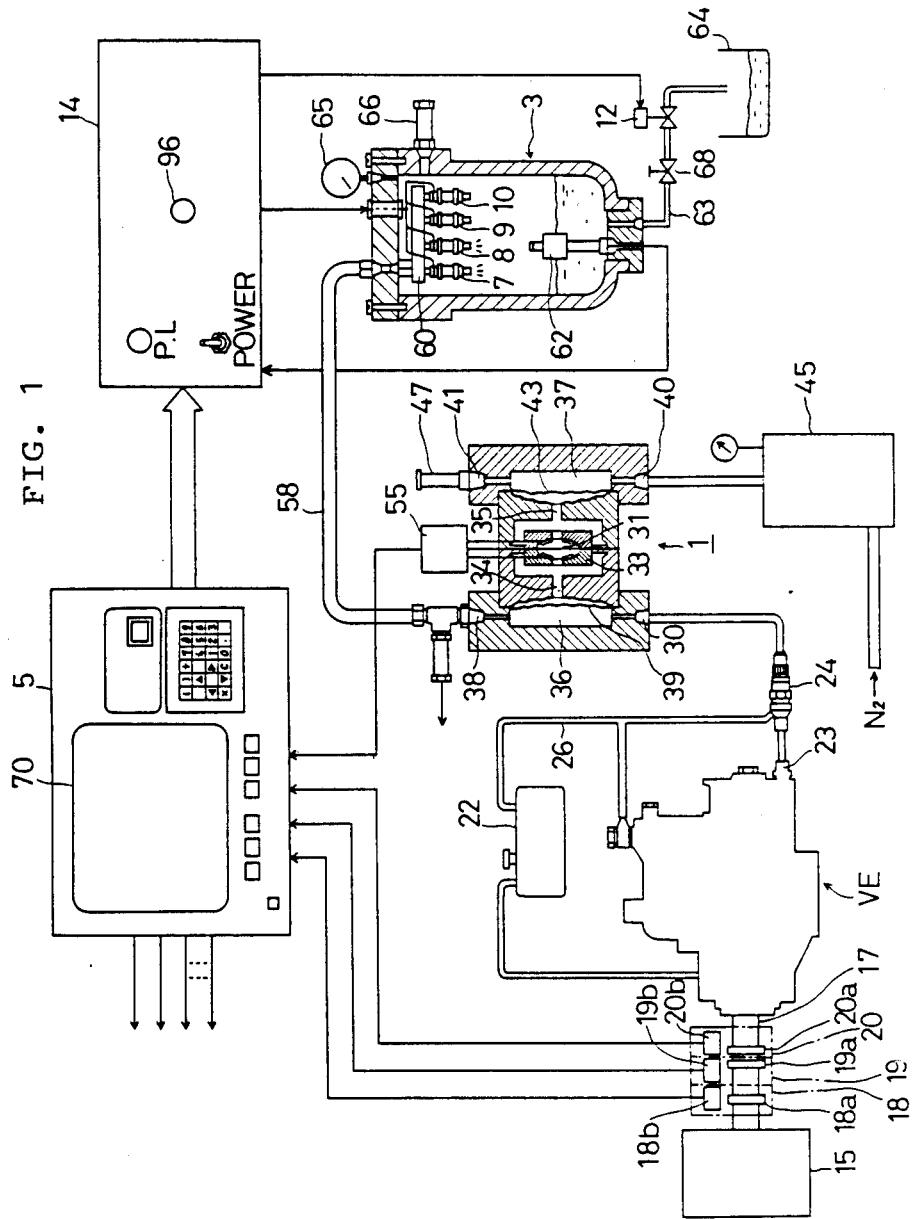
FIG. 1 is a schematic view of a measuring device for measuring a fuel injection quantity in a first embodiment according to the present invention.

FIG. 1 is a schematic view of a measuring device for measuring a fuel injection quantity in the first embodiment of the present invention.

As shown in FIG. 1, the measuring device for measuring the fuel injection quantity according to the present invention has a fuel volume detector 1, a discharge vessel 3 which discharges injected fuel, a measuring and controlling part 5 which measures and controls the fuel injection quantity, and a valve drive unit 14 which opens and closes discharge valves 7, 8, 9 and 10 of the discharge receiving vessel 3 and a drain exhaust valve 12. The measuring and controlling part 5 operates as a fuel injection quantity computing means. In the first embodiment, a fuel injection pump VE of a distributor injection type, which is used in a four-cylinder diesel engine, is provided at a bench for measurement, and a drive shaft 17 thereof is connected with a motor 15 instead of a diesel engine as a power source in practical use. Rotors 18a, 19a and 20a which are fixed on the drive shaft 17, form a speed sensor 18, a cylinder discrimination sensor 19 and a TDC sensor 20, respectively, with electro-magnetic pickup coils 18b, 19b and 20b facing the above three rotors 18a, 19a and 20a.

The distributor type fuel injection pump VE pumps up fuel from a fuel tank 22 by a feed pump inside (not shown) and sends it into a pressurizing pump chamber. Fuel pressed by a plunger (not shown) is forced to a fuel injection valve 24 with one of four delivery valves 23 prepared for four cylinders. FIG. 1 shows only one system of the valve 23 and the valve 24. Overflowing fuel is sent back to the fuel tank 22 by an overflow pipe 26.

The injection side of the valve 24 is connected to a port 30 of the fuel volume detector 1 by a pipe. The fuel volume detector 1 has a diaphragm chamber 33 with a diaphragm 31 and a back pressure chamber 37 which are provided substantially symmetrically about the chamber 33 with a fuel injection chamber 36 and the chambers 36 and 37 are connected with the chamber 33 by propagation passages 34 and 35.

The chamber 36 is provided with an exhaust port 38 on the other side of port 30, a part of its wall being a bulkhead 39 of a stainless film. The chamber 37 is provided with ports 40, 41, a part of which is a bulkhead 43 of a stainless film. The bulkheads 39, 43 separate the chamber 36 and the chamber 37 from propagation passages 34 and 35, respectively. Silicone oil, which has high insulation and predetermined dielectric constant, is filled up and enclosed in the propagation passages 34, 35 and the chamber 33. The displacement of the bulkhead 39 is caused by fuel sent to the chamber 36 by the valve 24, that is, the volume change of the chamber 36 is transmitted to the diaphragm 31 by the silicon oil in the propagation passage 34 so that it displaces the diaphragm 31. The displacement of the diaphragm 31 is transmitted to the bulkhead 43 by the silicone oil of the propagation passage 35 and displaces it to change the volume of the chamber 37. The chamber 37, which is connected with a constant pressure chamber 45 by the port 40 provided in the chamber 37, is filled with nitrogen gas ($N_2$) of a stable pressure. Accordingly, the chamber 37 is kept under a stable pressure by a low modulus of elasticity and enough dead volume including the constant pressure chamber 45, even when the bulkhead 43 is pushed by the displacement of the diaphragm 31. The port 41 is provided with a safety valve 47 with an actuation pressure of 100 kg/cm$^2$, to protect against the case that excessive pressure is added to the chamber 37, though there is provided a condition for measurement such that the pressure of nitrogen gas ($N_2$) can be arbitrarily determined between 10 and 60 kg/cm$^2$. The valve 47 thus operates as a back pressure holding means.

Figure 2:
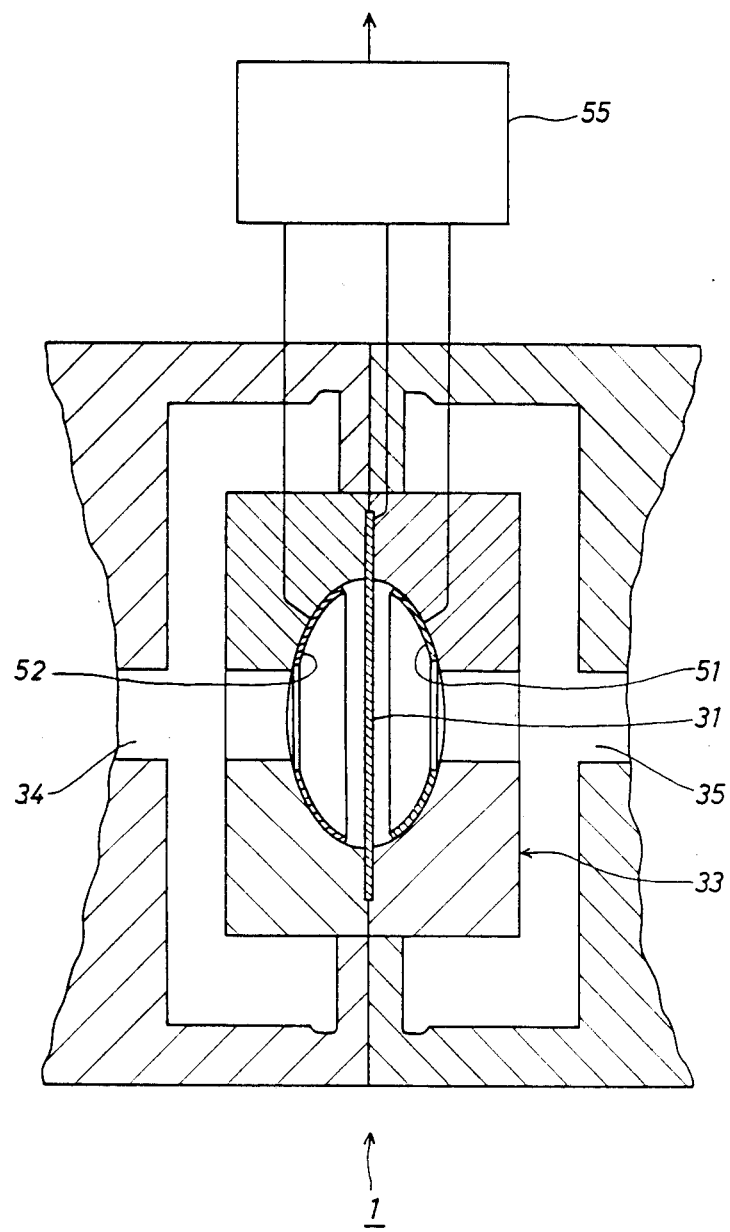
FIG. 2 is an enlarged sectional view of a diaphragm of the first embodiment.

The chamber 33, as shown in FIG. 2, has the diaphragm 31 of metallic film on the order of magnitude of 100 microns thickness at the center thereof, and independent electrodes 51, 52 provided at the inner walls facing the diaphragm 31 are formed concentrically with the diagram 31 by evaporation. There exists silicone oil with volume corresponding to clearance between the diaphragm 31 of metallic film and each of the electrodes 51, 52, because the silicone oil filling up the diaphragm chamber 33 has a high electrical insulation and a stable dielectric constant. A transmitting part 55, which is connected with the diaphragm chamber 33 and the electrodes 51 and 52, detects the above volume. The way of detection is described below.

Fuel which is sent to the chamber 36 by the fuel injection and varies the volume of the chamber 36 by pushing the bulkhead 39 is discharged from the exhaust port 38 into the discharge vessel 3 with a stable internal pressure (atmospheric pressure) by a discharge pipe 58 after measurement of the fuel quantity described below is finished. The chamber 36 is connected with a delivery pipe 60 by the discharge pipe 58. The delivery pipe 60 is provided with four valves 7, 8, 9 and 10 so that the fuel is discharged by opening the above valves 7, 8, 9 and 10. Discharged fuel, which is stored at the bottom of the discharge receiving vessel 3, is detected by an overflow switch 62 immediately when storage is over a predetermined quantity, so that a drain exhaust valve 12 is opened by the valve drive unit 14 and the fuel is discharged into a reservoir tank 64 by a drain pass 63. The discharge receiving vessel 3 is provided with a pressure gauge 65 which detects pressure therein and a safety valve 66. The drain pass 63 is provided with a manual valve 68.

As described above, fuel is sent by the fuel injection pump VE to the chamber 36 of the fuel volume detector 1 and varies the volume of the chamber 36 once. Then the above fuel is discharged into the discharge receiving vessel 3 by opening the valves 7, 8, 9 and 10 of the discharge vessel 3. Detection of the volume change of the fuel injection chamber 36 which synchronizes with operation of the fuel injection pump VE, opening control of the valves 7, 8, 9 and 10, and the like are exercised by the measuring and controlling part 5 and the valve drive unit 14 driven by it.

Figure 3:
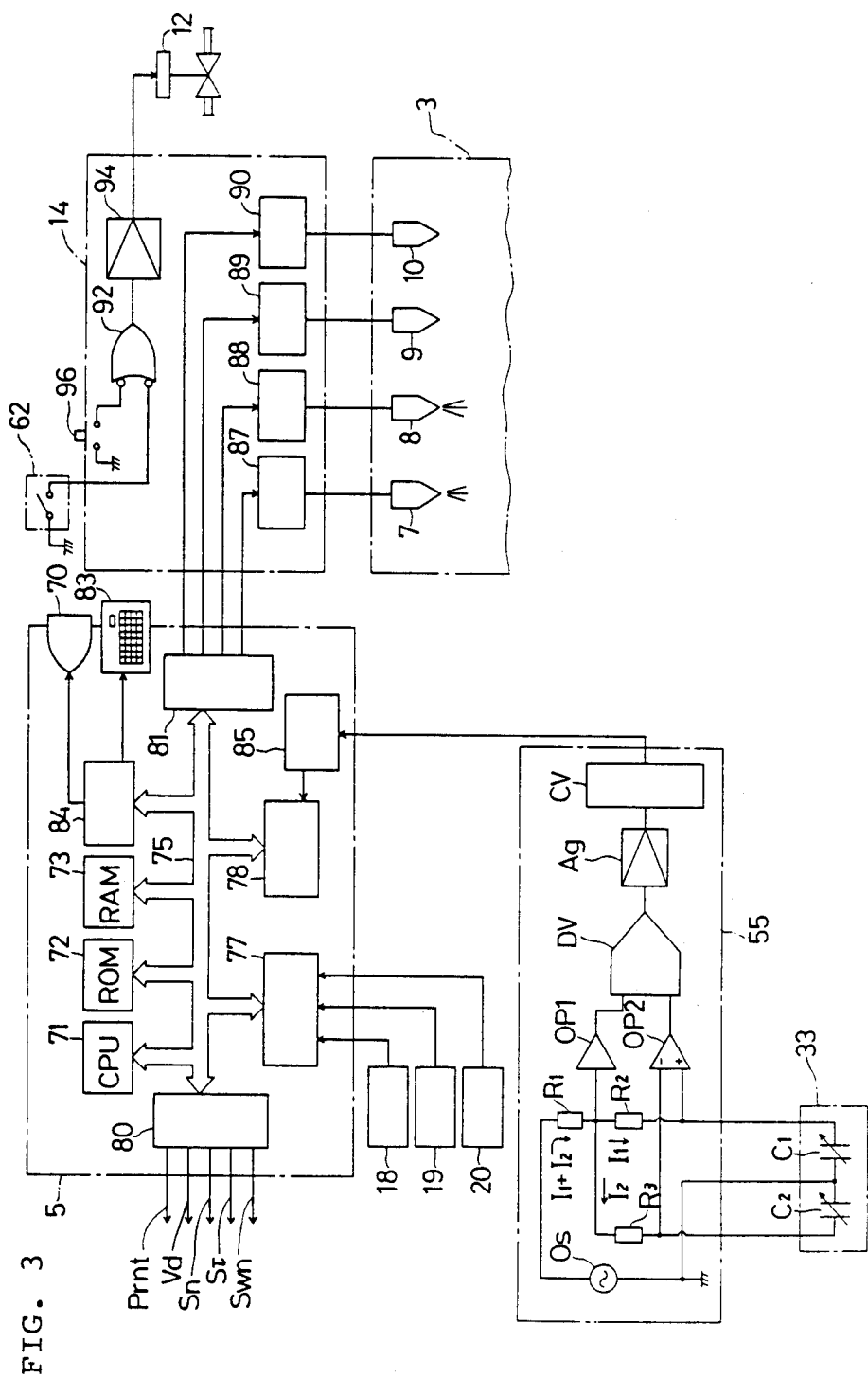
FIG. 3 is a block diagram of an electric system of the first embodiment.

The measuring and controlling part 5 inputs signals from the above speed sensor 18, and the cylinder discrimination sensor 19, the TDC sensor 20 and the transmitting part 55, and opens the discharge valves 7, 8, 9 and 10 by the valve drive unit 14 with a predetermined timing. It also measures the fuel injection quantity of the fuel injection pump VE in almost real time, and it displays the result on a CRT display 70. Furthermore, the measuring and controlling part 5 outputs measurement results etc. to another controlling device such as a host computer and the like. The inner constructions of the measuring and controlling part 5 and the valve drive unit 14 are hereinafter described with circuit construction of the transmitting part 55, with reference to FIG. 3.

The transmitting part 55 includes an oscillator Os, two operational amplifiers OP1, OP2, a divider Dv, a compensating amplifier Ag, a V/I converter Cv, and three precision resistors R1, R2 and R3 with the same resistance. A terminal on the side of a ground connection is connected with the diaphragm 31 of the chamber 33, and the other terminal is connected with R2, R3, and the operation amplifier OP1 by the resistor R1. The other ends of the resistors R2, R3 are connected respectively with the electrodes 51, 52 facing the diaphragm 31. As described before, the volume which exists in response to clearance d between the diaphragm 31 and the electrodes 51, 52 are shown as variable capacitance condensers C1, C2 in FIG. 3.

One of the input terminals of the operation amplifier OP2 is connected with the resistor R2 and the electrode 51, and the other is connected with the resistor R3 and the electrode 52, respectively, so that output voltages of OP1, OP2 are determined in response to electric current I1, I2 from the oscillator Os into a circuit which consists of R1, R2, R3 and C1, C2. That is, the output voltage V1 of the OP1 V1 is calculated by the following equation:

$$V1 = K1 \times (I1 + I2)$$

where K1 is a proportional coefficient.

Output voltage of the OP2 is calculated by the following equation:

$$V2 = K2 \times (I1 - I2)$$

where K2 is a proportional constant. Therefore, output of OP1, OP2 is inputted into the Dv and divided thereby, and the output thereof is compensated by the Ag, so that output voltage Vo can be obtained proportionally to $(I1-I2)/(I1+I2)$. Electric currents I1, I2 respectively correspond to C1, C2 formed between the electrodes 51, 52, so that output voltage is proportional to $(C1+C2)/(C1+C2)$. The above output voltage Vo is output to the measuring and controlling part 5 by the Cv which improves noise reduction, and it converts output voltage Vo into an electric current signal of 4–20 mA.

The measuring and controlling part 5 is a logic operation circuit with well-known CPU71, ROM72, and RAM73. The CPU71 is connected to the ROM72, the RAM 73 and each port for inputting or outputting data with each other via a bus 75. A pulse input port 77 and an analog input port 78 function to input the data. An output port 80 and an output port for controlling discharge valves 81 function to output the data. A terminal I/O port 84 functions input or to output the data to or from the CRT display 70 and a key board panel 83. The CPU 71 executes processing or inputting/outputting of the data through the respective port based on a preset program primarily stored in the ROM 72. The pulse input port 77 is connected with the sensors 18, 19, and the TDC sensor 20, respectively, so that a CPU 71 can read a cylinder discriminating signal D containing data such as a rotation number N of the fuel injection pump VE, determination of a cylinder on fuel injection timing, and timing TDC when a piston of a fuel injecting cylinder gets at a top dead center position through the port 77. The analog input port 78 is connected to an I/V converter 85 which converts an electric current signal of 4–20 mA from the transmitting part 55 into a voltage signal. The CPU 71 inputs a signal corresponding to the displacement of the diaphragm 31 $(C1-C2)/(C1+C2)$ via the above analog input port 78.

The input port 80 which is connected to a printer, monitor TV, a warning light, a host computer, and the like (not shown) outputs a printing signal Prnt, a video signal Vd, a speed signal Sn, a fuel injection signal S tau, a warning signal Swn and the like. The output port 81 is connected to drivers 87, 88, 89 and 90. The CPU 71 outputs a control signal via the output port 81 so that the discharge valves 7, 8, 9 and 10 respectively connected to the drivers 87, 88, 89, 90 can be opened.

The valve drive unit 14 has a NAND gate 92 and a driver circuit 94 therein. One input of the NAND gate 92 is connected to an overflow switch 62, and the other input is connected to a manual operation switch 96, respectively. Accordingly, in either case that the overflow switch 62 turns on due to the increase of fuel inside the discharge vessel 3 or the manual operation switch 96 turns on, the valve 12 is opened.

Figure 4:
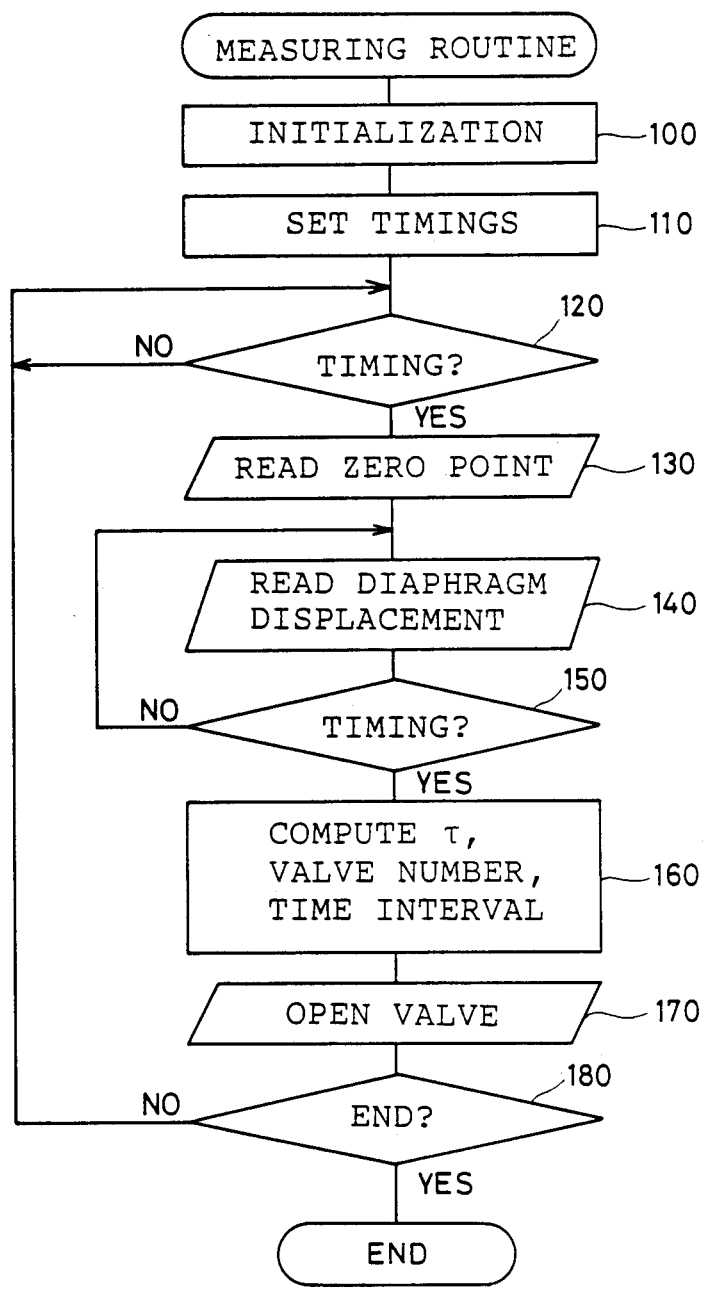
FIG. 4 is a flow chart which shows a routine for measuring and controlling the fuel injection quantity at a measuring and controlling part according to the first embodiment.

Next, measurement of the fuel injection quantity by the measuring and controlling part 5 is hereinafter described with reference to a flow chart in FIG. 4. The measuring and controlling part 5 starts operation from step 100 when electric current is input. First, at step 100, initialization such as clearing of inner registers of the CPU 71 etc. is executed. The program then proceeds to step 110 where a first timing and a second timing are determined. (The above first timing is set up for calibration of a zero point in measurement of the fuel injection quantity. The second timing is set up for the fuel injection and discharge establishment.)

More specifically, when the motor 15 is activated to start measurement, the measuring and controlling part 5 displays displacement of the diaphragm 31 input from the transmitting part 55 on the CRT display 70, also opening and closing the valves 7, 8, 9 and 10 with a suitable timing (default value). Variation of displacement of the diaphragm 31 is displayed on the CRT display 70 as a graph in which the abscissa is a crank angle 0°-720° so that an operator sets up a crank angle just before fuel injection starts as the first timing, and a crank angle after fuel injection is finished as a fuel discharge timing is established by using the keyboard panel 83, based upon the displacement of the diaphragm 31 displayed on the CRT display 70. The program then proceeds to step 120 to measure the fuel injection quantity.

At step 120, it is determined whether the crank angle reaches at the first timing. The crank angle is detected by the rotation number signal N input from the sensor 18, which is output at every 30 CA°, based upon timing TDC at a top dead center position which is input from the TDC sensor 20 by the pulse input port 77.

When it is detected that the crank timing has reached at the first timing set up at the step 110, the determination of step 120 is YES. Then, the program proceeds to step 130 where a zero point is read. The read operation is done so as to set the displacement of the diaphragm 31 just before the fuel injection as a zero point for measuring the fuel injection quantity, and excludes measurement error caused by drift of the measuring system.

The program proceeds to step 140 where the displacement of the diaphragm 31 is measured. The above measurement is repeated until the determination of step 150 whether the crank angle has reached at fuel discharge timing becomes YES. That is, the variation of the displacement of the diaphragm 31 has been measured sequentially until just before the fuel injection is finished and the fuel is discharged.

The displacement quantity of the diaphragm 31 is read by the analog input port 78. The transmitting part 55 inputs a signal which is proportional to $(C1-C2)/(C1+C2)$ wherein C1, C2 are the volumes formed between the electrodes 51, 52 by the diaphragm 31. They are shown as follows:

$$C1 = \text{epsilon} \times A/(do - \text{delta} - d) \quad (1)$$

$$C2 = \text{epsilon} \times A/(do + \text{delta} - d) \quad (2)$$

$$\text{delta} - d/do = (C1 - C2)/(C1 + C2) \quad (3)$$

where A is the area of the electrodes 51, 52, epsilon is the electric constant of the silicon oil enclosed inside the chamber 33, at a mean value of the distance between the diaphragm 31 and the electrodes 51, 52, delta−d is the displacement of the diaphragm 31 by the fuel injection, and do is a fixed value. The equation (3) shows that the output signal of the transmitting part 55 corresponds to the displacement of the diaphragm 31, delta−d.

Figure 5:
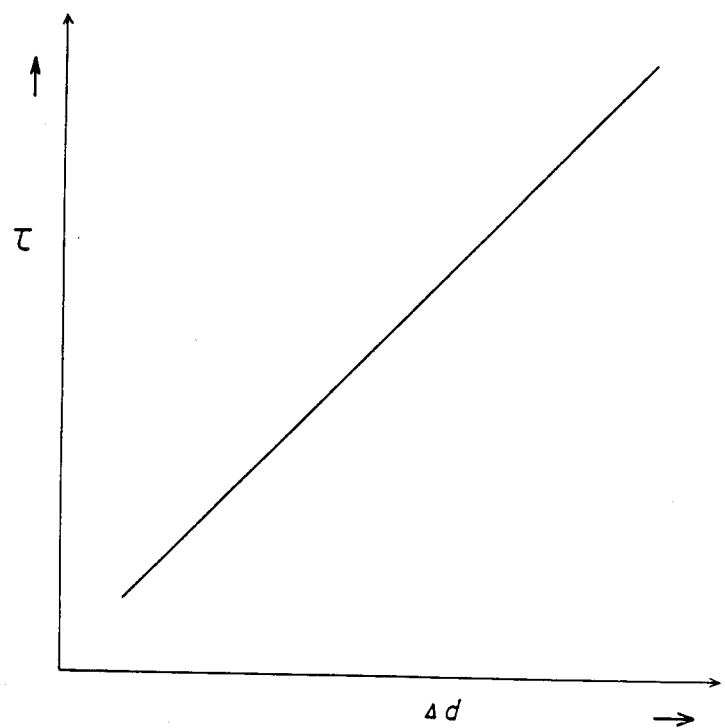
FIG. 5 is a graph which shows the relationship between a displacement of the diaphragm delta—d and the fuel injection quantity tau according to the first embodiment.

When the determination of step 150 is YES, that is, when it is determined that the crank angle has reached at the second timing, the program proceeds to step 160. In step 160, the controlling quantity of the valves 7, 8, 9 and 10, which correspond to calculation of the fuel injection quantity tau, is computed. In this embodiment, the fuel injection quantity tau is easily calculated by the equation tau = K3 × delta−d, where K3 is a coefficient, because the prediction that delta−d and tau have a proportional relationship, as shown in FIG. 5, is previously ascertained experimentally. The controlling quantity of the valves 7, 8, 9 and 10 at step 160 is the number of the valves to be opened and the period of time to open the discharge valve 7 for discharging fuel injected into the chamber 36, because the opening period of time of the discharge valve 7 is variable, while those of other valves 8, 9 and 10 are fixed.

At step 170, a valve opening signal of the discharge valves 7, 8, 9 and 10 is output by the output port 81, according to the controlling quantity computed at step 160. This controlling signal is sent by the valve drive unit 14 and converted into a driving signal for the valves 7, 8, 9 and 10 by he drivers 87, 88, 89 and 90 to be output to each valve, respectivley. As the result of the operation, the valves 7, 8, 9 and 10 are opened suitably, and fuel in the chamber 36 is discharged exactly in accordance with the injected quantity. The discharge quantity is controlled exactly so that the fuel injection quantity can be measured exactly at every fuel injection, so that precision of measurement can be prevented from falling due to bubbles generated in fuel of the chamber 36 when the valve opening periods of the valves 7, 8, 9 and 10 are excessive.

The program proceeds to step 180 where it is determined whether or not the measurement of the fuel injection quantity should be finished. If the measurement should be carried on, the program returns to step 120 where determination and operation of the step either 120 or 180 is repeated. The program exits to END and the controlling routine is finished. When the measurement is finished, for example, a key is operated to stop the measurement at the keyboard panel 83 of the measuring and controlling part 5.

As can be seen from the above description, according to the present embodiment, by maintaining the pressure in the chamber 36 identical to that of the chamber 37, the device injects fuel by the quantity, which is derived in response to the displacement of diaphragm, thus allowing accurate (e.g. within ±0.1 mm³) wide range (0–100 mm³/stroke) measurement. Further, the device can start measuring a fuel injection quantity immediately after a fuel injection is completed. It is thus possible to measure with high response the fuel injection quantity of the fuel injection pump VE of a diesel engine driven at a high speed. It also enables the easy measurement of a scattering fuel injection quantity due to a rough engine, and allows quick adjustment of the fuel injection pump VE. The pressure in the chamber is easily variable, whereby it is possible to have the pressure in the chamber 36 as a condition under which the injection quantity is measured, thereby offering the measurement substantially in the actual circumstances.

The present device has the structure wherein the injected fuel does not directly press the diaphragm 31 but indirectly displaces it via silicon oil within the pass 34 and the bulkhead 39. The dielectric constant epsilon of the medium between the electrodes 51 and 52 is thus held to be constant, thereby improving accuracy of measurement. The displacement of the bulkhead 39 keeps in bounds when the pressure of the chamber 36 is excessive. Accordingly, displacement of diaphragm 31 for measurement does not develop into a serious damage and accurate measurement is achieved. Furthermore, the displacement of diaphragm 31 is sequentially measured so that datum in the course of fuel injection can be obtained thereby detecting exact characteristics of the fuel injection pump VE.

Figure 6:
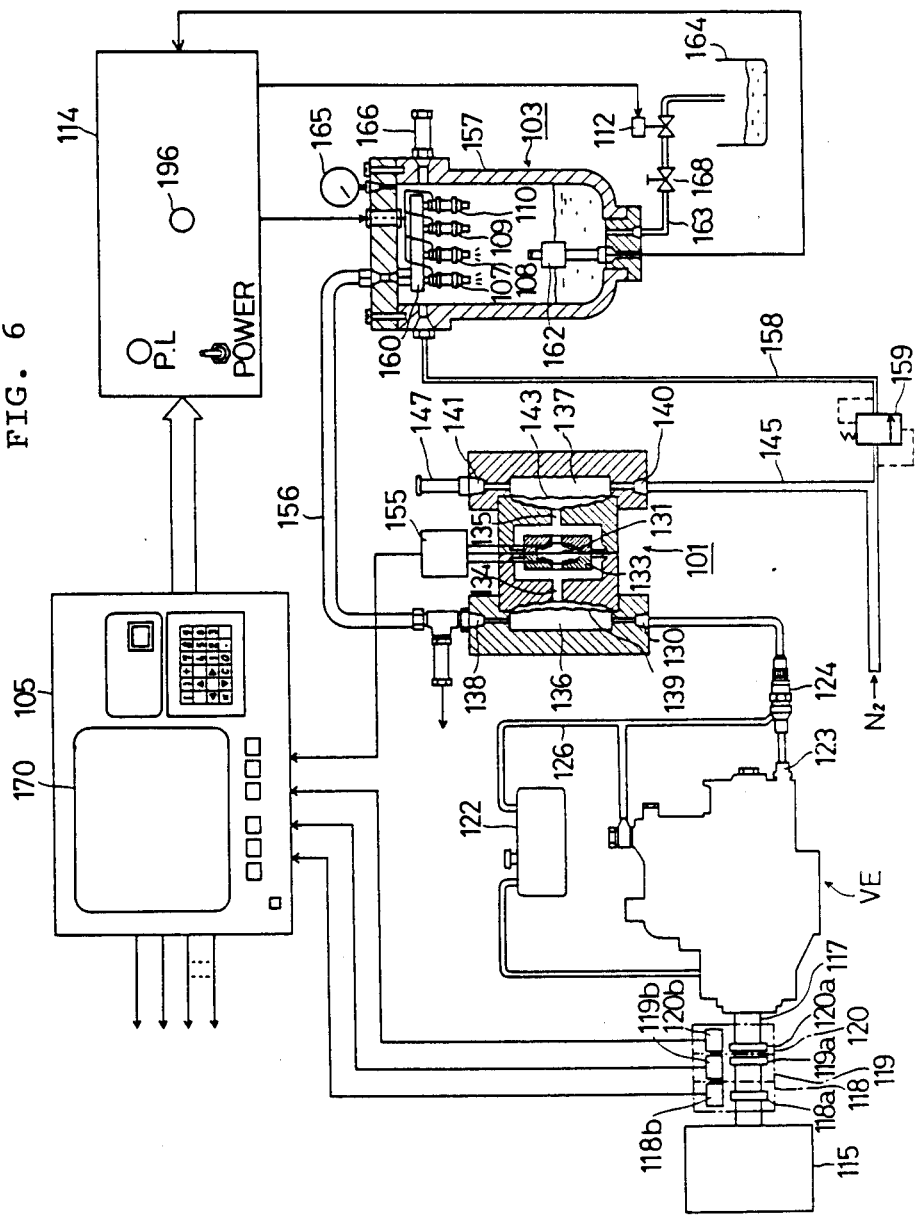
FIG. 6 is a schematic view of a measuring device for measuring a fuel injection quantity in a second embodiment of the present invention.
Figure 7A:
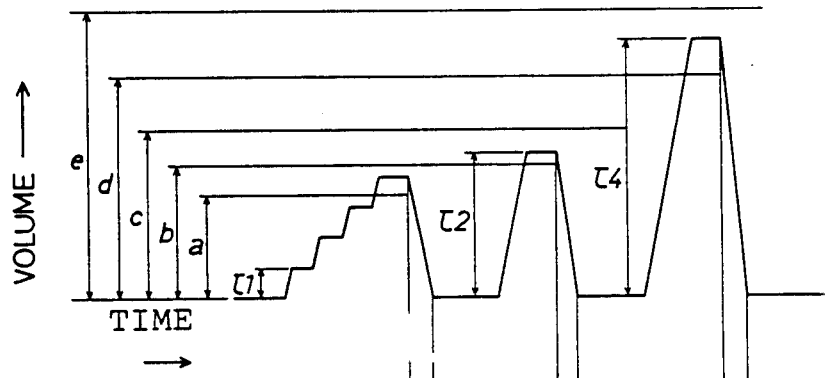
FIGS. 7A-7E are timing charts which show the relationship between the fuel injection quantity tau and discharge valves.
Figure 7B:
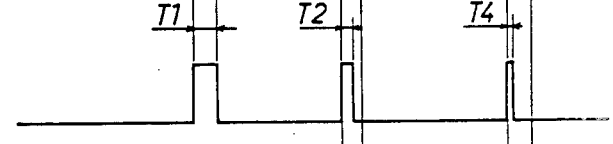
Figure 7C:
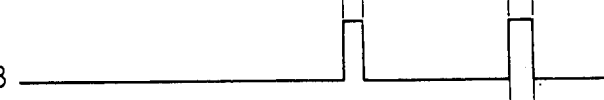
Figure 7D:
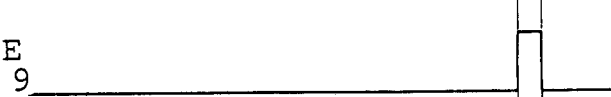
Figure 7E:

Set forth below is the description of the second embodiment of the present invention. Fig. 6 illustrates a system similar to FIG. 1 except that a constant pressure delivery pipe 145, a differential pressure regulator 159, and a connecting piping 158 are provided in place of a constant pressure chamber 45. Since the second embodiment is similar to the first embodiment, FIGS. 2 thru 5 can be substituted for describing the construction of the device, the flow chart or the like with reference to the second embodiment; thus the drawings and corresponding description are omitted. In the second embodiment, 100 is added to the numeral of each element in FIG. 1.

In FIG. 6, the back pressure chamber 137 is connected via port 140 to the pipe 145, allowing the pipe 145 to fill with nitrogen gas. When the bulkhead 143 is pressed by the diaphragm 31, the pressure in the chamber 137 is slightly raised (10 tenths of back pressure) to a quantity made negligible due to the low bulk-modulus of nitrogen gas ($N_2$) and the dead volume of the back pressure chamber 137. It is possible to determine the nitrogen gas pressure optionally within the range 10–60 $Kg/cm^2$ as one of the measuring conditions. Considering excessive pressure, the safety valve 147 activated at 100 $Kg/cm^2$ serves as a back pressure chamber pressing means and is provided at the other port 147 of the chamber 137.

The fuel is injected into the fuel injection chamber 136 so as to press the bulk 139 and vary the volume of the chamber 136. After measurement of fuel injection quantity as described later, fuel is injected from the exhaust port 138 via the discharge valve 156 into the discharge vesssel 157, in which the pressure is held at a constant value with a predetermined difference from the chamber 137. The differential pressure regulator 159 serves as the pressure holding means which holds the above-mentioned difference, which is provided in the piping 158 interconnecting the pipe 145 to the vessel 157.

FIGS. 7A thru 7E are timecharts illustrative of the relationship between the number of the discharge valve computed at step 160 and the volume. The differential pressure regulator 159 controls the pressure difference between the valve 156 and the vessel 157, and since the opening areas of the respective discharge valves 7, 8, 9 and 10 are fixed, the discharge quantity of the discharge valve is determined in response to the opening time interval. The valve 107 changes the discharge quantity by varying the opening time interval while the other valves 108, 109, and 110 discharge a constant quantity by fixing the opening time interval, thereby achieving the desired discharge quantity when combining the valve 107 and the other valves 108, 109 and 110. The discharge quantity is computed as follows.

$$delta - T = Q1/(alpha \times A1) \tag{4}$$

where T is the opening time interval, A1 is opening area, alpha is coefficient of discharge, and Q1 is the discharge quantity.

Q2, Q3, and Q4 represent the discharge quantity of the discharge valves 108, 109, 110, respectively. Referring to FIG. 7, when the fuel injection cumulative quantity tau-1 injected into the chamber 136 is less than a predetermined volume a, the measurement is continued until the quantity tau-1 quantities up to the volume a. When the quantity tau-1 is more than the volume a, the discharge valve 107 is opened during the time interval T1 computed in accordance with the above-mentioned equation (4) so that the fuel quantity Q1 is discharged. When the fuel injection quantity tau-2 is more than the volume b and less than the volume c, the discharge valves 107 and 108 are activated, thereupon the discharged quantity is the discharge quantity Q1 by the valve 107 plus the discharge quantity Q2 by the valve 108. The quantity Q1 is set at tau minus Q2, the opening time interval T2 of the valve 107 being calculated from equation (4) by substituting the quantity Q1 for the above-mentioned Q1 thus calculated. Similarly, when the fuel injection quantity tau is greater than the volume b and less than the volume c, the valves 107, 108, and 109 are activated and opened, thereupon the discharge quantity is the quantity Q1 plus Q2 plus Q3. The quantity Q1 is set at tau minus the quantity Q2 plus Q3, and the opening time interval T3 of the valve 107 is calculated from equation (4) by substituting the quantity Q1 for the above-mentioned Q1 thus calculated.

Similarly, when the fuel injection quantity tau is greater than the volume d and less than the volume e, the valves 107, 108, 109, and 110 are activated and opened, thereupon the discharge quantity is the quantity Q1 plus Q2 plus Q3 plus Q4. The quantity Q1 is set equal to tau minus the quantity Q2 plus Q3 plus Q4, and the opening time interval T4 of the valve 107 is calculated from equation (4) by substituting the quantity Q1 for the above-mentioned Q1 thus calculated. The volume e is the maximum measurable limit per one injection. As described above, the determination as to the discharge valve to be opened and the opening time interval T thereof is made in response to the fuel injection quantity tau.

A third embodiment according to the present invention will be described. Since FIGS. 1–3 and 5 of the first embodiment serves for describing the constructions disclosed in the third embodiment, the drawings and description are omitted. In the third embodiment, 100 is added to the numeral of each element in FIG. 4.

Figure 8:
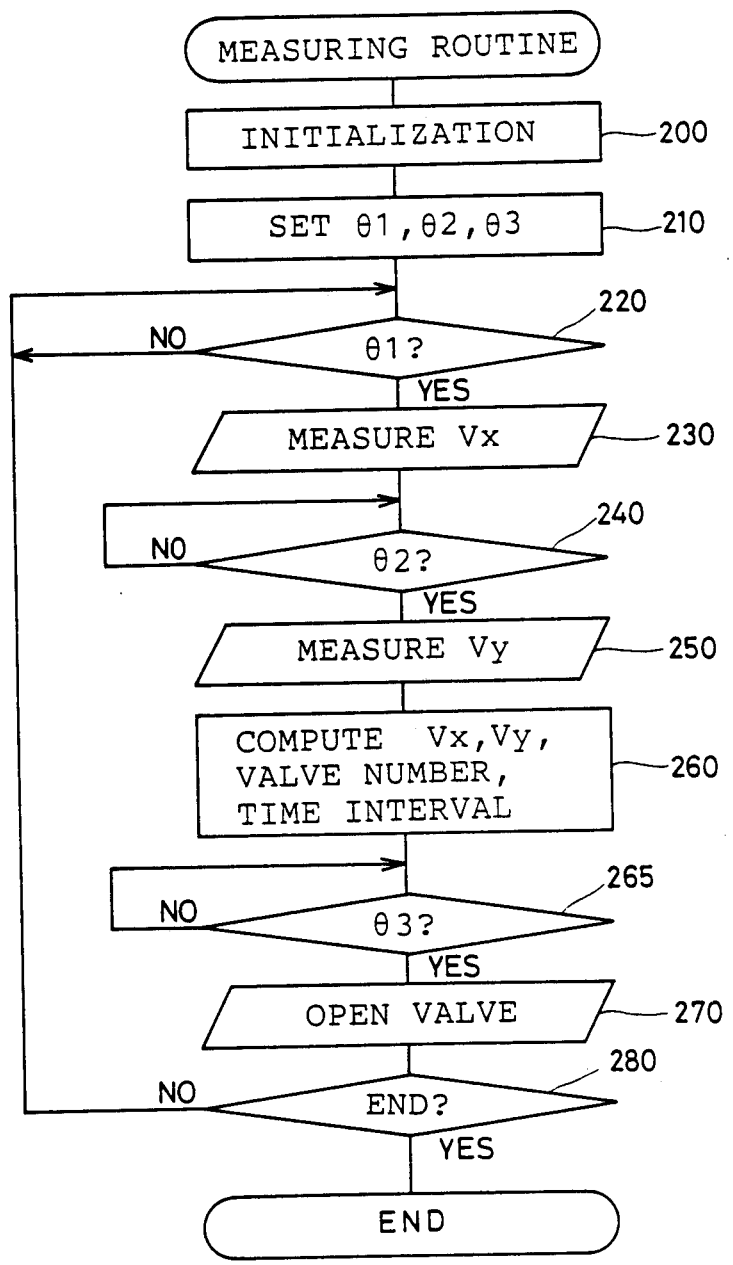
FIG. 8 is a flow chart for measuring a fuel injection quantity in a third embodiment according to the present invention.

FIG. 8 illustrates a flowchart for measuring the fuel injection quantity by the regulating part according to the third embodiment. FIGS. 9A thru 9D illustrate timing charts thereof. Referring now to FIG. 8, an explanation follows of the control process steps by the regulating part 105 according to the present embodiment.

The program begins with step 200 in response to power supply. At step 200, initialization such as clearing the register of the CPU 171 is executed. At step 210, first, second, and third timings are set. The first timing is for reading a zero point which calibrates the measurement of a fuel injection quantity, which represents a crank angle immediately after the start of the fuel injection. The second timing is for reading a volume signal representative of the displacement of the diaphragm 131 after the fuel injection. The timing represents a crank angle, corresponding to which a volume signal V after the injection becomes stable at a predetermined level. The third timing is for discharging fuel. The timing represents a crank angle, corresponding to which quantity of fuel to be discharged becomes more than a reference quantity Qs. As set forth below, each respective step executed in the routine is explained.

Figure 9:
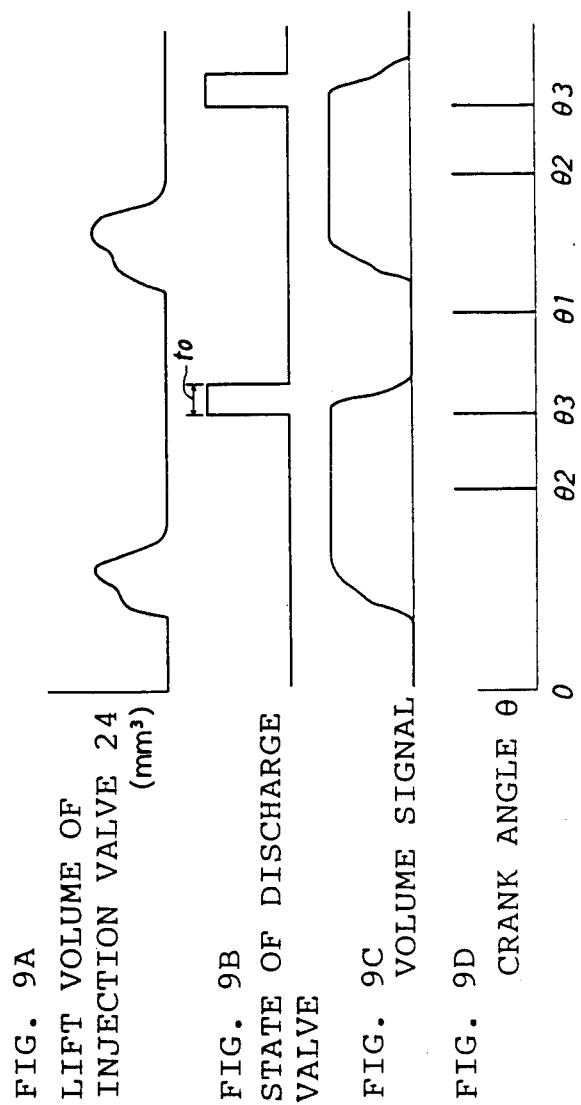
FIGS. 9A-9D are timing charts which show a timing of measurement in the third embodiment.

Upon activation of the motor 115, the fuel injection valve 124 is lifted and selectively opens and closes the valves 107, 108, 109, and 110 at every appropriate time interval (FIG. 9B), which is set at a default value. The measuring and controlling part 105 displays on the CRT display 170 the displacement of the diaphragm 131, as input by the transmitting part 155 (FIG. 9A). The varying displacement of the diaphragm 131 is plotted as a graph with a crank angle of 0°-720° as the abscissa (FIG. 9D). With reference thereto, an operator, using the volume signal displayed on the display 170, defines the crank angles as the foregoing timings.

The volume signal decreases to the initial position because the injected fuel is discharged into the discharge vessel 103, and the diaphragm 131 returns to its original position upon activation of the valve 107, 108, 109, and 110 during the time interval t0. At this time, the crank angle theta-1 is set at the first timing wherein the volume signal is set at zero. Upon injection, the diaphragm 131 outputs a volume signal proportional to the injected quantity into the chamber 136 (FIG. 9C). After completion of the injection, the volume signal is in stable condition at the predetermined level.

At the subsequent step 220, it is determined whether a crank angle theta equals the timing theta-1. The crank angle theta is sensed in response to a timing TDC representative of a top dead center position, which is input from the TDC sensor 120 via the pulse input port 177, referring to a speed signal N, which is input from the speed sensor 218 at every 30° CA. If the determination is NO, the program is delayed until the crank angle theta equals the timing theta-1.

At step 230, the volume signal Vx at the zero point is read. At the subsequent step 240, it is determined whether or not the crank angle corresponds to the read timing theta-2 immediately after the fuel injection. If the determination is NO, the program is delayed until the determination is YES. If the determination is YES, the program proceeds to step 250 where an input voltage Vy is read based upon electrostatic capacitance immediately after the fuel injection. The above-mentioned Vx and Vy are used to determine the relative difference of displacement of the diaphragm 131. The displacement thereof is computed in response to the volume signal V, to which the fuel quantity F in the fuel injection chamber 136 is proportional. More specifically, while the displacement of the diaphragm 131 is read via the analog input port 178, an input signal V0 input by the transmitting part 155 is proportional to $(C1-C2)/(C1+C2)$. C1 and C2 represent the capacitance between the diaphragm 131 and either the electrode 151 or 152, each being derived respectively from the following equations:

$$C1 = \text{epsilon} \times A/(d0 - \text{delta} - d) \quad (5)$$

$$C2 = \text{epsilon} \times A/(d0 + \text{delta} - d) \quad (6)$$

where A, epsilon, d0, and delta−d represent the area of the electrode 151 or 152, the dielectric constant of the silicon oil in the diaphragm chamber 133, the average of the distance between diaphragm 131 and the electrode either 151 or 152, and the displacement of the diaphragm 131 responsive to the fuel injection quantity, respectively.

From the foregoing equations (5) and (6), the following is obtained:

$$\text{delta} - d/d0 = (C1 - C2)/(C1 + C2) \quad (7)$$

The distance d0 is a constant, it will thus be understood from the equation (7), that the volume signal V0 output from the part 155 corresponds to the displacement delta−d of the diaphragm 131. Delta−d is representative of the displacement wherein the diaphragm 131 does not move. Relative differences of displacement delta−d is described by the following equation:

$$\text{delta} - d = \text{delta} - dy - \text{delta} - dx$$

where delta−d represents the displacement of the zero point in measuring, delta−dx represents the displacement after injection wherein delta−dx corresponds to input voltage Vx, and delta−dy corresponds to input voltage Vy. Thus, delta−d corresponds to the relative difference between Vx and Vy.

At step 260, the fuel injection quantity tau is computed, and the control quantity of the valve 107, 108, 109, and 110 is computed in response to the quantity tau.

Further, an experiment verifies, as shown in FIG. 5, that the fuel quantity tau in the fuel injection chamber 136 is proportional to the displacement delta−d of the diaphragm 131 in the third embodiment. The fuel quantity tau thus equals coefficient K3 multiplied by the displacement delta−d. The above-mentioned control quantity represents the number of discharge valves 108, 109 and 110 and the opening time interval of valve 107 in order to inject fuel accumulated in the chamber 136. The valve 107 has a variable opening time interval while the other valves 108, 109, and 110 have a fixed opening time interval. At the subsequent step 265, it is determined whether or not the crank angle theta corresponds to timing theta-3 for discharging fuel. If the determination is NO, progress to step 270 is delayed. If the determination is NO, the program proceeds to step 270 where the control signal to open valves 107, 108, 109, and 110 is generated via the output port 181 in accordance with the control quantity calculated at step 260. This control signal is sent to valves 107, 108, 109 and 110 via the drive circuit 187, 188, 189 and 190 of the valve drive unit 114, thereby opening the discharge valves 107, 108, 109, and 110 and counterbalancing the injected fuel quantity and the discharge quantity. Prolonged opening of valves 107, 108, 109, and 110 and the formation of bubbles in the chamber 136 are avoided, thus achieving accurate measurement.

At subsequent step 280, determination is made as to whether the measurement is terminated. If the determination is N, the program returns to step 220 and repeats executing steps 220 through 280. If the determination is N, for example, when any key of the keyboard 183 is depressed, the program terminates.

It will be understood from the above description that similar advantages to the first embodiment are obtained and accurate measurement achieved despite dispersion of measuring accuracy of valves 107, 108, 109 and 110, and despite using low accuracy valves and despite dispersion of discharge due to alteration of differential pressure between the chamber 136 and the vessel 103. Moreover, accurate measurement is achieved despite the fact that the diaphragm 131 does not return to its original location due to a response delay therein.

Figure 10:
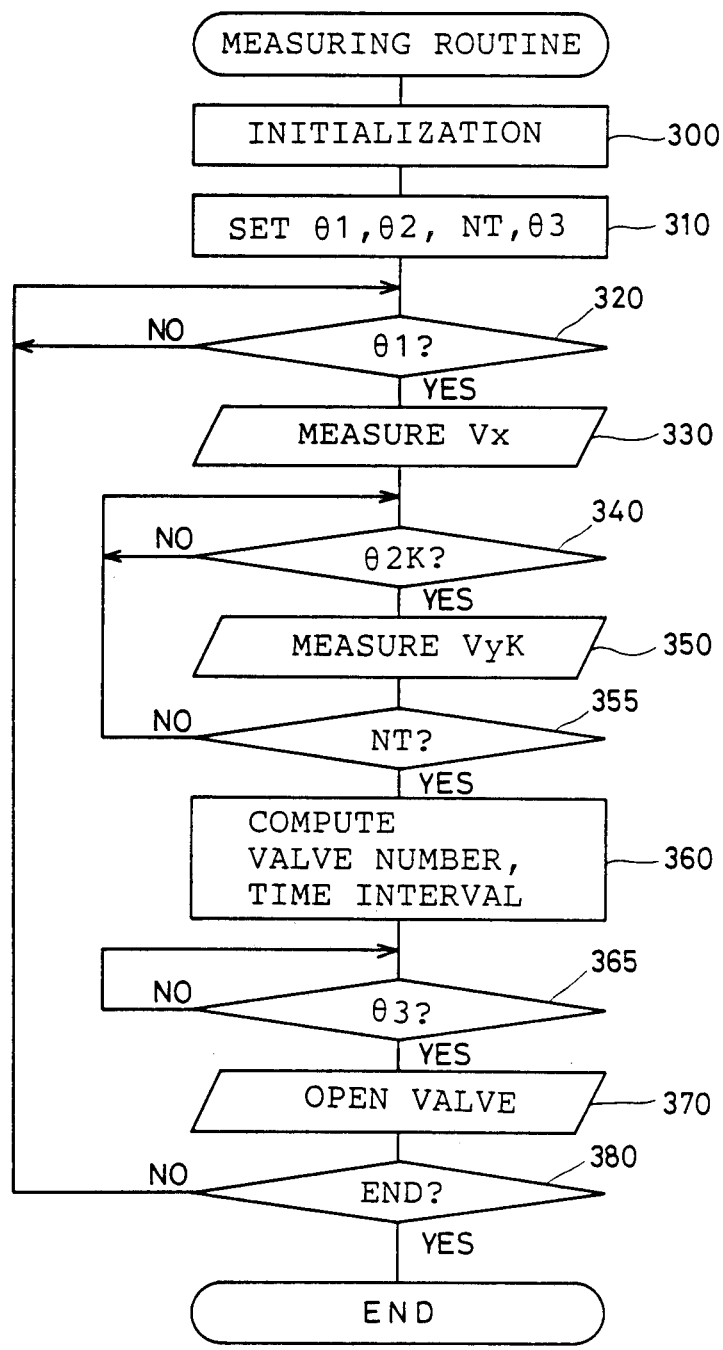
FIG. 10 is a flow chart for measuring a fuel injection quantity in a fourth embodiment of the present invention.

FIG. 10 illustrates a flowchart on how to measure the fuel injection quantity by the regulating part according to the fourth embodiment. FIGS. 11A thru 11C illustrate timing charts thereof. Referring now to FIG. 10, an explanation follows of the control process steps enacted by the regulating part 105 according to the fourth embodiment. The structure thereof is identical to that of the third embodiment shown schematically, so the drawings and explanations are omitted. The program according to FIG. 10 is similar to that of FIG. 8 except that the fuel injection number of times NT is determined at step 310 and that the determination whether or not the fuel injection number of times NT is a predetermined number is determined at step 355.

After initialization at step 300, at step 310 the number NT is made equal to 3. More specifically, after activation of the valves 107, 108, 109, and 110 as shown in FIG. 11A, when the volume signal goes to the zero level, the crank angle theta1 is determined as shown in FIG. 11C. When the volume signal is in stable condition at the predetermined level, the crank angle theta 2-1 as the timing for measuring the input voltage Vy1 based upon the electrostatic capacitance is determined. The crank angle theta-2-2 as the timing for measuring the output voltage Vy2 after the fuel injection is then determined. The crank angle theta 2-3 as the timing for measuring the input voltage Vy3 is next determined. After step 310, steps from 320 to 355 are performed for the input voltage Vx at the zero point, and the input voltages Vy1, Vy2 and Vy3 shown in FIG. 11B after the fuel injection are measured. When the number of measurement of the input voltage, the determination at step 355 becomes YES, and then the program proceeds to step 360 where the cumulative fuel injection quantity is computed in accordance with the relative difference Vy3−Vx between the input voltage Vx and Vy3. The valve numbers to be opened and the opening time interval are computed in accordance with the above-mentioned relative difference. The quantity of every injection s also computed in response to the relative differences Vy1−Vx, Vy2−Vy1, and Vy3−Vy2, respectively. The program then proceeds to step 365. Thereafter similar processing steps to the third embodiment are executed.

The fourth embodiment offeres the following advantages additionally to those of the third embodiment.

The fuel is discharged from the chamber 136 in accordance with a plurarity of (three in the present embodiment) fuel injections. If the valves 107, 108, 109, and 110 are opened for an injection of an extremely small fuel quantity which is less than the minimum discharge therefrom, the pressure in the chamber 136 is decreased, with forms generating in the fuel therein. The measuring device according to the present embodiment solves this problem. It is thus possible to set the fuel injection quantity at an extremely small value (less than 0.1 mm$^3$) which is less than the minimum discharge from the valves 107, 108, 109, and 110, such as the value of idling time. The device thus achieves a wide range of measurement.

The present embodiment, similarly to the third embodiment, introduces the structure in which the injected fuel displaces the diaphragm 131 via the silicon oil in the bulkhead 139 in the propagation passage 134 instead of compressing it directly. Therefore, the dielectric constant epsilon of the medium, which defines the capacitance between the electrodes 151 and 152 by the diaphragm 131, is maintained constant, whereby the measurement accuracy is enhanced.

Further, the bulkhead 139 is not deformed more than is predetermined, in spite of the exceeding pressure in the chamber 136. The structure prevents damage to the diaphragm 131 due to the exceeding pressure, thereby avoiding the reduced measuring accuracy.

Hereinafter, a fifth embodiment of the present invention will be described. Since the constructions of the devices disclosed in the fifth embodiment are similar to those of the second embodiment, the corresponding figures serve for describing this embodiment. Thus the drawings and corresponding descriptions are omitted.

Figure 12A:
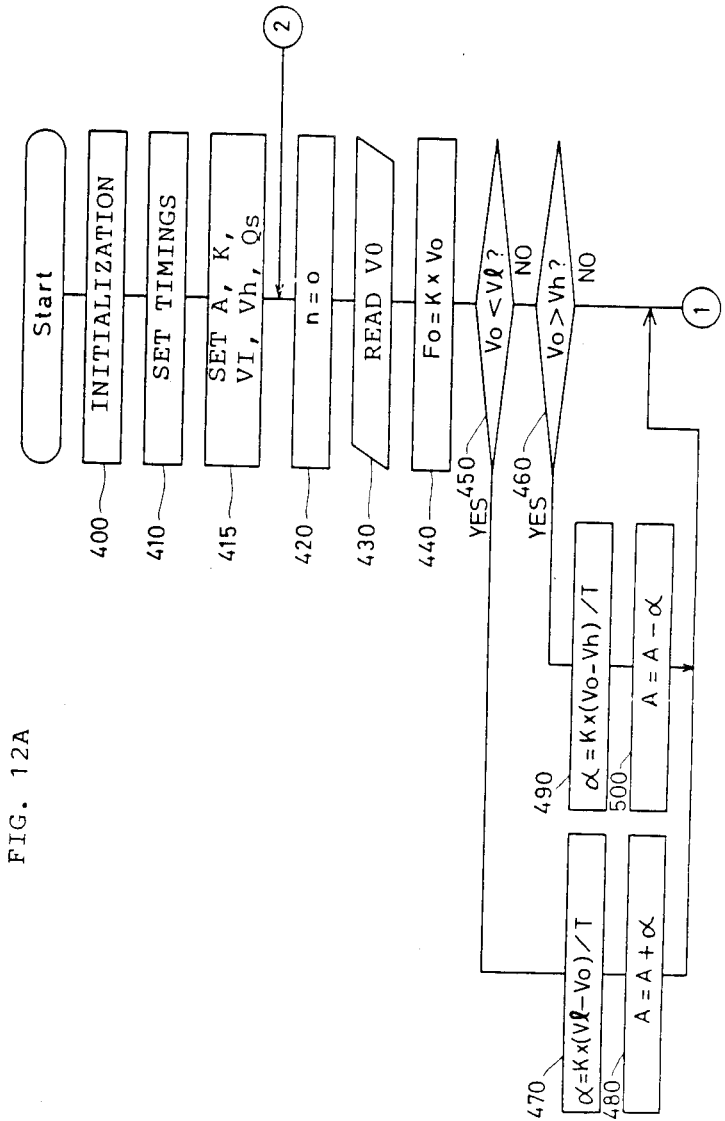
FIGS. 12A and 12B are flow charts which show a routine for measuring and controlling a fuel injection quantity by a measuring and controlling part in a fifth embodiment.
Figure 12B:
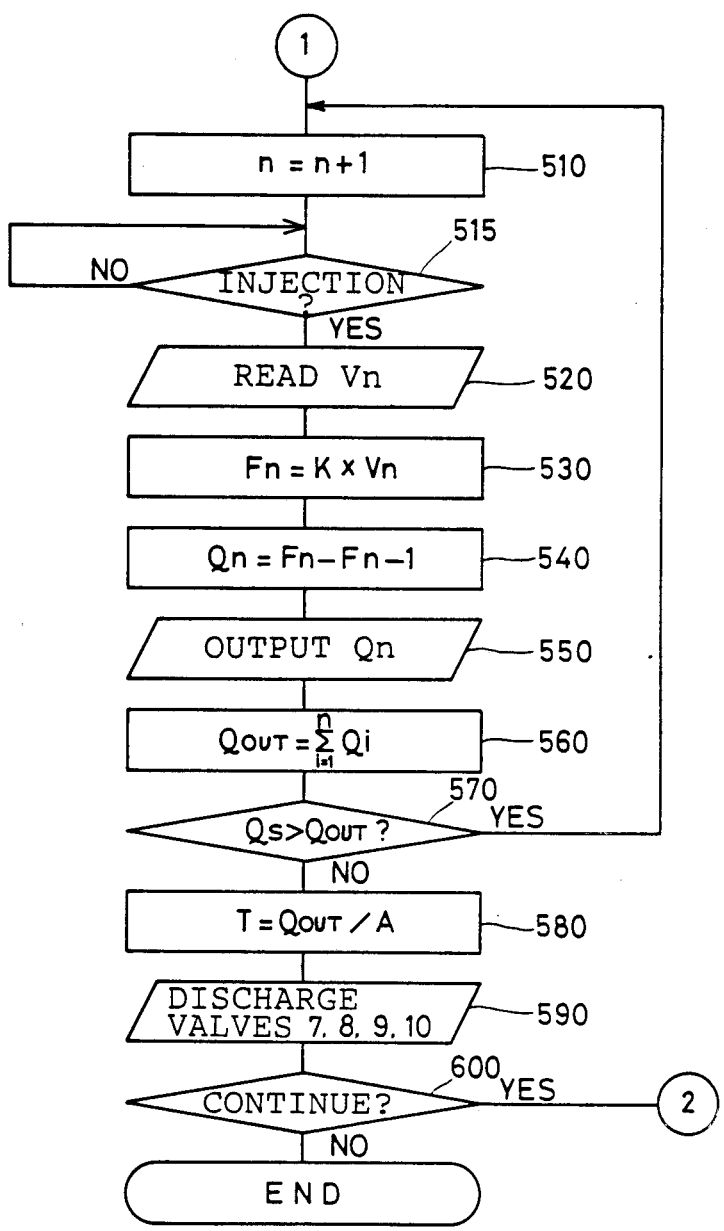

Referring now to FIGS. 12A and 12B, explanation follows of the control process steps managed by the measuring and controlling part 105 according to the fifth embodiment. The program beings with step 400 in response to power supply. At step 400, initialization such as clearing the register of the CPU 171 is executed. Then, at step 410, the first, second, and third timings are set. The first timing is for reading a zero point to calibrate for measuring a fuel injection quantity, which represents a crank angle immediately before the start of the fuel injection. The second timing is for reading a volume signal representative of the displacement of the diaphragm 131 after a fuel injection. The timing represents a crank angle, to which a volume signal V after the injection becomes correspondingly stable at a predetermined level. The third timing is for discharging fuel. The timing represents a crank angle, to which a quantity of fuel to be discharge becomes more than a reference quantity Qs.

Upon activation of the motor 115, discharge valves 107, 108, 109, and 110 selectively open and close at appropriate time intervals, which set at a default value. The regulating part 105 displays on the CRT display 170 the displacement of the diaphragm 131, which is input by the transmitting part 155. The varying displacement of the diaphragm 131 is plotted as a graph with a crank angle of 0°–720° as an abscissa. With reference thereto, an operator, using the keyboard panel 183, defines the crank angles as the foregoing timings.

The program then proceeds to step 415, where proportional constants A and k, upper and lower limit constants Vλ and Vh (Vλ<Vh), and the reference quantity Qs are set by means of the keyboard panel 183. The constant A defines the relationship between a time interval T, during which the discharge valves 107, 108, 109, and 110 are opened, and a discharge Qout. The constant k defines the relationship between a volume signal V representative of an output voltage in the transmitting part 155 and a fuel quantity in the fuel injection chamber 136. The constants Vλ and Vh define an allowable range of a volume signal V0 representative of a volume at the zero point before fuel injection. The reference quantity Qs determines whether a fuel quantity injected into the chamber 136 requires discharging.

The program proceeds to step 420 where a variable n representative of fuel injection frequency is restored to zero. This process step is indispensable, when either the program is executed from the very beginning or the measurement is continued after the discharge of the fuel in the fuel injection chamber 136.

At the subsequent step 430, the volume signal at the zero point V0 is read in response to the crank angle, which has been defined as the first timing at step 410. The step has a function of defining the displacement of the diaphragm 131 immediately after fuel injection as the zero point for measuring the fuel injection quantity, thereby eliminating erroneous measurement caused by various drifts of a measuring system.

The program then proceeds to step 440, where a fuel quantity F0 in the fuel injection chamber 136 corresponding to the volume signal V0 at the zero point is derived from the following equation:

$$F0 = k \times V0.$$

Explanation of this equation follows. The displacement of the diaphragm 131 is computed in response to the volume signal V, to which the fuel quantity F in the fuel injection chamber 136 is proportional. More specifically, while the displacement of the diaphragm 131 is read via the analog input port 178, a displacement signal input by the transmitting part 155 is proportional to $(C1-C2)/(C1+C2)$. C1 and C2 represent the capacitance between the diaphragm 131 and either an electrode 151 or 152, respectively, each being derived from the following equations:

$$C1 = \text{epsilon} \times A/(d0 - \text{delta} - d) \quad (8)$$

$$C2 = \text{epsilon} \times A/(d0 + \text{delta} - d) \quad (9)$$

where A, epsilon, d0, and delta−d respectively represent the area of either electrode 151 or 152, the dielectric constant of the silicon oil in the diaphragm chamber 133, the average of the distance between the diaphragm 131 and either electrode 151 or 152, and the displacement of the diaphragm 131 responsive to the fuel injection quantity.

From the foregoing equations (8) and (9), the following is obtained:

$$\text{delta} - d/d0 = (C1 - C2)/(C1 + C2) \quad (10)$$

Since the distance d0 is a constant, it will thus be understood from the equation (10) that the volume signal V output from the part 155 corresponds to the displacement delta−d of the diaphragm 131.

Figure 13:
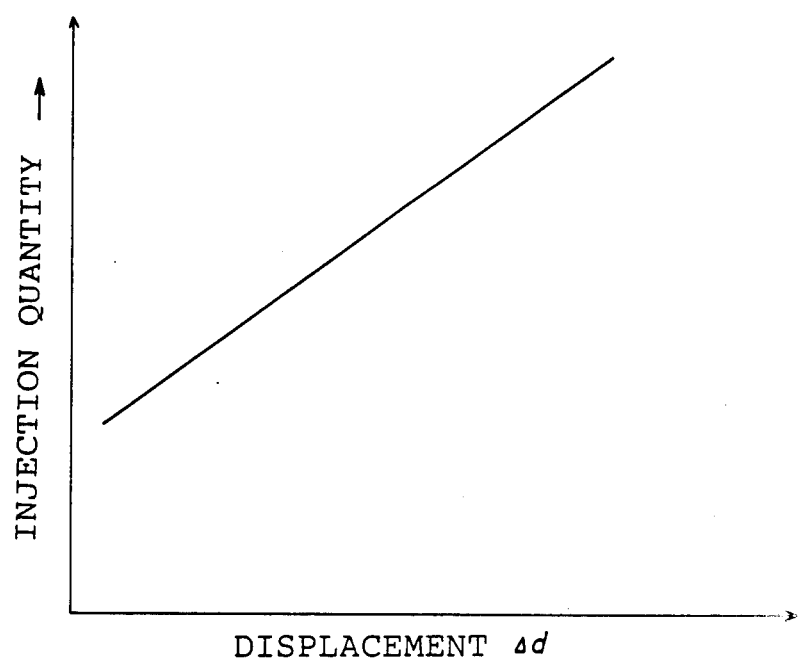
FIG. 13 is a graph which shows the relationship between a displacement delta−d of a diaphragm and a fuel quantity in a fuel injection chamber according to the fifth embodiment.

Further, an experiment verifies, as shown in FIG. 13, that the fuel quantity F in the fuel injection chamber 136 is proportional to the displacement delta−d of the diaphragm 131 in the present embodiment. The fuel quantity F equals k1 (coefficient) multiplied by the displacement delta−d, which is responsive to the volume signal V. The fuel quantity F thus equals the constant k multiplied by the volume signal V. After step 440, the program proceeds to steps 450 and 460, where it is determined whether the volume signal V0 read at the step 430 is within the allowable range. If the determination is NO, the constant A, which defines the relationship between the time interval T and the discharge Qout is corrected at further steps (steps 470–500). These steps are explained in detail below.

If the volume signal V0 is determined to be less than the lower limit constant Vλ at step 450, the program proceeds to steps 470 and 480, where the correction is made according to the following equations:

$$\text{alpha} = k \times (V\lambda - V0) \quad \text{(step 470)}$$

$$A = A + \text{alpha} \quad \text{(step 480)}$$

where the value of the constant A is increased. This new value is used in the subsequent steps, because the volume signal V0 is less than the constant Vλ. The time interval T is set at a default value, which is defined theoretically and experimentally by the constants A, k and the discharge Qs, all having been set at step 415.

If, on the other hand, the determination is NO at step 450, the program proceeds to step 460. If the volume signal V0 is determined to be greater than the upper limit constant Vh thereat, the program proceeds to steps 490 and 500, where the correction is made according to the following equations:

$$\text{alpha} = k \times (V0 - Vh)/T \quad \text{(step 490)}$$

$$A = A - \text{alpha} \quad \text{(step 500)}$$

where the constant A is set at a lower value, because the volume signal V0 is greater than the constant Vh.

After $V\lambda \leq V0 \leq Vh$ is satisfied in the foregoing steps, the program proceeds to step 510. At further steps beginning therewith, a fuel injection quantity is measured and fuel is discharged.

At step 510, the variable n representative of fuel injection frequency is increased by 1. At step 515, the program proceeding is delayed until the crank angle requires the fuel injection.

The program then proceeds to step 520 where a volume signal Vn after the fuel injection is read in response to the crank angle representative of the second timing, which is set at the step 410. The volume signal Vn represents the displacement of the diaphragm 131 in the fuel injection chamber 136.

At the subsequent step 530, a fuel quantity Fn in the fuel injection chamber 136 corresponding to the volume signal Vn is derived, as it is at the foregoing step 440, from the following equation:

$$Fn = k \times Vn$$

At step 540, an n-th fuel injection quantity Qn is computed (Qn=Fn−Fn−1). The n-th fuel injection quantity Qn is to be output on the CRT display 170 at step 550.

The program proceeds to step 560, where the discharge Qout is computed in response to the n-th fuel injection quantity Qn according to the following equation:

$$Q\text{out} = \sum_{i=1}^{N} Qi$$

At step 570, it is then determined whether the reference quantity Qs is greater than the discharge Qout. If the determination is YES, the foregoing process steps 510–560 are executed repeatedly, without discharging the fuel in the fuel injection chamber 136, until the discharge Qout exceeds the reference quantity Qs. Then the program proceeds to step 580.

At step 580, the time interval T is computed for discharging fuel of the quantity Qout, which is more than the reference quantity Qs, in response to the value of the constant A according to the following equation:

$$T = Qout/A$$

At step 590, the fuel in the fuel injection chamber 136 is discharged to the discharge receiving vessel 103 by opening the discharge valves 107, 108, 109, and 110 for the time interval T. Set forth below are steps 580 and 59 explained in detail.

The proportional constant A, which defines the relationship between the time interval T and the discharge Qout, is corrected in response to the volume signal V0. If the signal V0 is less than the lower limit constant Vλ, the constant A is accordingly increased in order to make the time interval T (=Qout/A) shorter, thereby discharging the fuel by a quantity less than the discharge Qout. Thus, the fuel quantity in the fuel injection chamber 136 after the fuel injection, that is, before the subsequent fuel injection, becomes more than that before the former one, with the volume signal V0 corrected to be greater. If, on the other hand, the signal V0 is greater than the upper limit constant Vh, the constant A is accordingly decreased in order to make the time interval T (=Qout/A) longer, thereby discharging the fuel by a quantity more than the discharge Qout. Thus, the fuel quantity in the fuel injection chamber 136 after the fuel injection, that is, before the subsequent fuel injection, becomes more than that before the former one, with the volume signal V0 corrected to be greater.

Figure 14:
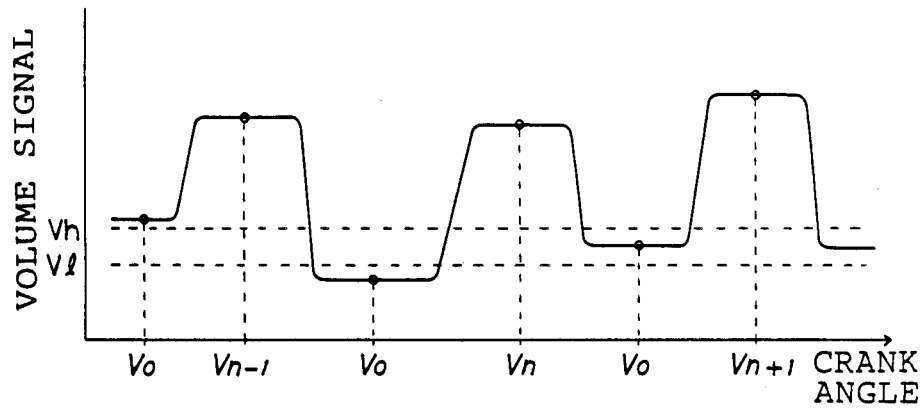
FIG. 14 is a graph which shows the relationship between the fuel injection quantity and the discharge according to the fifth embodiment.

Therefore, as shown in FIG. 14, even if the volume signal V0 at the zero point is not within the allowable range, the repetition of the foregoing steps 420–590 adjusts the discharge until it is.

Figure 15:
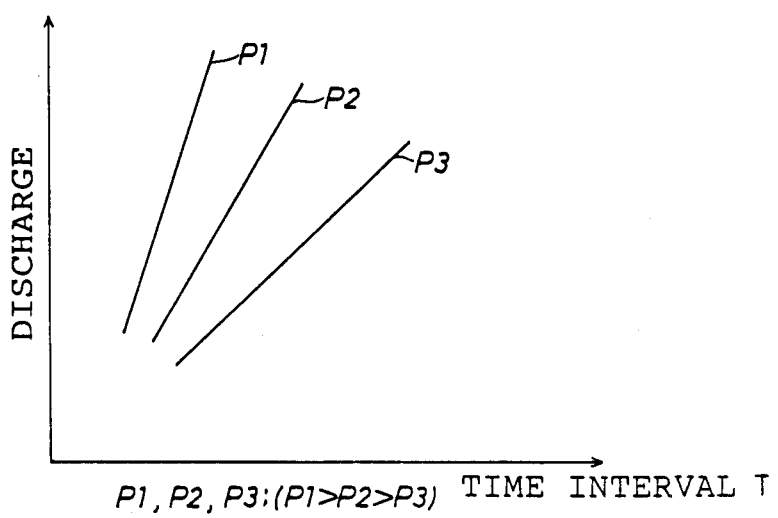
FIG. 15 is a graph which shows the relationship between the opening hour of discharge valves and the fuel discharge quantity according to the fifth embodiment.

Referring further to FIG. 15, there is shown the relationship between the time interval T and the discharge corresponding to pressure differentials P1, P2, and P3. It will be understood therefrom that the discharge is proportional to the time interval during which the discharge valves 107, 108, 109, and 110 are opened.

After step 590, the program proceeds to step 600, where it is determined whether the measuring steps 420–590 should continue. If the determination is YES, the program returns to step 420, and another fuel injection quantity is computed. If the determination is NO, the measuring routine is terminated.

Set forth below are the advantages offered by the fifth embodiment except those similar to the second embodiment.

The measuring device according to the present embodiment starts measuring a fuel injection quantity immediately after a fuel injection is completed. It further discharges fuel thereon, correcting the time interval during which the discharge valves 107, 108, 109, and 110 are open, by the use of a constant pressure differential between the back pressure chamber 137 and the discharge chamber 157. Thus the volume signal V0 at the zero point after the discharge is maintained within the allowable range (Vλ≦V0≦Vh).

The above-mentioned degree of control permits the discharge to correspond to the fuel injection quantity. The volume of the fuel in the fuel injection chamber 136 is restored immediately thereafter to the volume before the fuel injection. It enables continuously accurate measurement of the fuel injection quantity. It is thus possible to measure with quick response the fuel injection quantity by a fuel injection pump VE of a diesel engine driven at high speed. The foregoing also enables the easy measurement of a varying fuel injection quantity caused by a rough engine, and allows for quick adjustment of the fuel injection pump VE.

A sixth embodiment will be described. Since the sixth embodiment is similar to the first embodiment, FIGS. 1, 2, and 5 of the first embodiment serves for describing the constructions disclosed in the sixth embodiment; therefore the drawings and corresponding drawings are omitted. In the sixth embodiment, 200 is added to the numeral of each element in FIG. 1.

Figure 16:
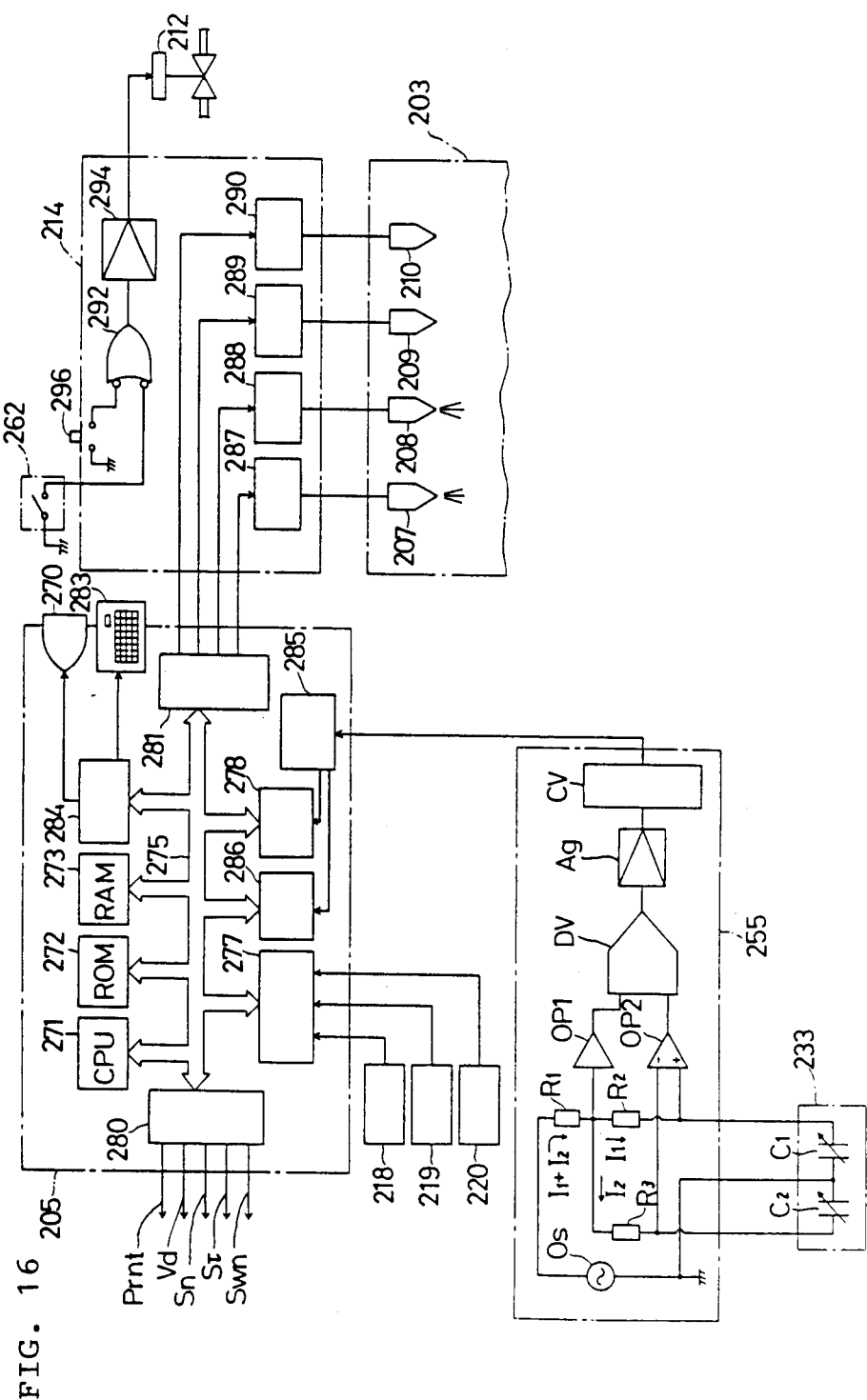
FIG. 16 is a block diagram which shows an electric system in a sixth embodiment.

Referring now to FIG. 16, therein is shown an electric system of the sixth embodiment. The structure thereof is identical to that of the first embodiment with the exception that a peak hold circuit 286 is provided.

Receiving a volume signal V output from an I/V converter, the peak hold circuit 286 stores a peak value Vp thereof. It is thus possible for the CPU 271 to input the peak value of the signal (C1−C2)/(C1+C2), which is responsive to the displacement of the diaphragm 231. The peak value Vp of the signal is stored until the peak hold circuit 286 is reset by the CPU 271.

Figure 17A:
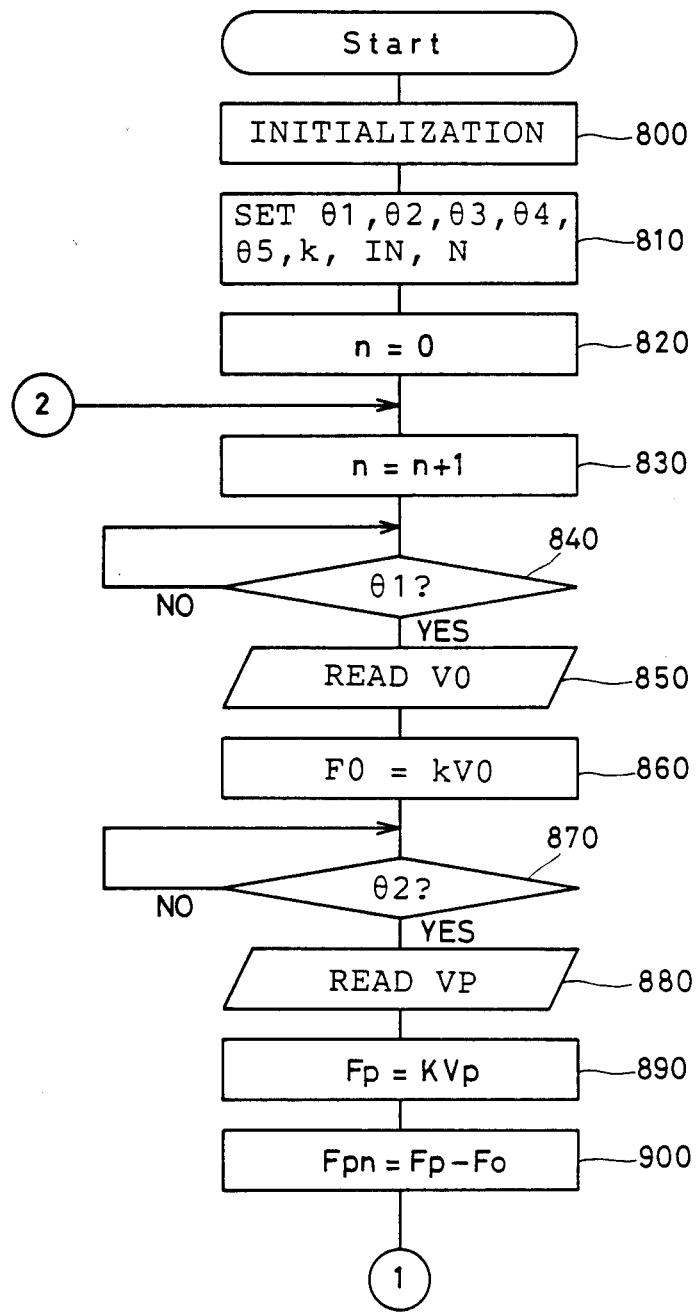

Referring now to FIGS. 17A and 17B, explanation follows of the control process steps managed by the measuring and controlling part 205. The program begins with step 800 in response to power supply. At step 800, initialization such as clearing the register of the CPU 271 is performed. At step 810, timings theta-1, theta-2, theta-3, theta-4, and theta-5, a proportional constant k, an initial fuel injection frequency IN, and a fuel injection frequency N (N>IN) are set by means of the keyboard panel 283. The timings theta-1, theta-2, theta-3, are for reading a zero point from which to measure a fuel injection quantity, for reading the peak value Vp of the signal, and for reading a stable state volume signal Vm, respectively. Both the timings theta-4 and theta-5 are for discharging fuel. The proportional constant k defines the relationship between the volume signal V and a fuel quantity F.

Upon activation of the motor 215, the fuel injection valve 224 is lifted, thereby injecting fuel. Discharge valves 207, 208, 209, and 210 selectively open and close at appropriate timings, which are set at a default value. The regulating part 205 then displays on the CRT display 270 the volume signal V responsive to electrostatic capacity of the diaphragm 231, which is input by the transmitting part 255. The varying signal is plotted as a graph with a crank angle of 0°–720° as an abscissa. With reference thereto, an operator sets the timings theta-1, theta-2, theta-3, theta-4, and theta-5, which are explained hereinunder referring to FIGS. 18A and 18B.

The timing theta-1 represents a crank angle, as described later, to which the volume signal V of the level before measuring is correspondingly read. When the fuel flowing into the fuel injection chamber 236 is discharged to the discharge receiving vessel 203 by the operation of the valves 207, 208, 209, and 210, th diaphragm 231 returns to its initial position. It is then that the volume signal V returns to the original level.

The timing theta-2 represents a crank angle, to which every peak value of the volume signal V, being stored at the circuit 286 immediately after fuel is injected into the chamber 236, is correspondingly read.

The timing theta-3 represents a crank angle, to which the volume signal V, becoming stable at a predetermined level after the fuel injection into the chamber 236, is correspondingly read.

The timing theta-4 represents a crank angle, in response to which the valves 207, 208, 209, and 210 are opened after the signal Vm has been read, thereby discharging the fuel in the chamber 236 to the vessel 203.

The timing theta-5 represents a crank angle, in response to which the valves 207, 208, 209, and 210 are opened after the signal Vp has been read, thereby discharging the fuel in the chamber 236 to the vessel 203.

After step 810, the program proceeds to step 820 where a variable n representative of fuel injection frequency is set at zero. Then, at step 830, the variable n is increased by 1. At the subsequent step 840, it is determined whether a crank angle theta equals the timing theta-1. the crank angle theta is sensed in response to a timing TDC representative of a top dead center position which is input from the TDC sensor 220 via the pulse input port 277 with reference to a speed signal N which is input from the speed sensor 218 at every 30° CA. If the determination is NO, the program proceeding to step 850 is delayed until the the crank angle theta equals the timing theta-1.

At step 850, the volume signal V0 at the zero point is read. The step has the function of defining the displacement of the diaphragm 231 immediately before fuel injection as the zero point for measuring a fuel injection quantity, thereby eliminating erroneous measurement caused by various drifts of the measuring system.

The program then proceeds to step 860, where a fuel quantity F0 in the fuel injection chamber 236 corresponding to the volume signal V0 at the zero point is derived from the following equation:

$$F0 = k \times V0.$$

The displacement of the diaphragm 231 is computed in response to the volume signal V, to which the fuel quantity F in the fuel injection chamber 236 is proportional. More specifically, while the displacement of the diaphragm 231 is read via an analog input port 278, a displacement signal input by the transmitting part 255 is proportional to $(C1-C2)/(C1+C2)$. C1 and C2 represent the capacitance between the diaphragm 231 and either an electrode 251 or 252, respectively, each being derived from the following equations:

$$C1 = \epsilon \times A/(d0 - delta - d) \quad (11)$$

$$C2 = \epsilon \times A/(d0 + delta - d) \quad (12)$$

where A, epsilon, d0, and delta−d respectively represent the area of either the electrode 251 or 252, the dielectric constant of the silicon oil in the diaphragm chamber 233, the average of the distance between the diaphragm 231 and either the electrode 251 or 252, and the displacement of the diaphragm 231 responsive to the fuel injection quantity.

From the foregoing equations (1) and (2), the following is obtained:

$$delta - d/d0 = (C1 - C2)/(C1 + C2) \quad (13)$$

The distance d0 is a constant, it will thus be understood from the equation (3), that the volume signal V output from the transmitting part 255 corresponds to the displacement delta−d of the diaphragm 231.

Further, an experiment verifies, as shown in FIG. 5 in the first embodiment, that the fuel quantity F in the fuel injection chamber 236 is proportional to the displacement delta−d of the diaphragm 131 in the present embodiment. The fuel quantity F equals k1 (coefficient) multiplied by the displacement delta−d which is responsive to the volume signal V. The fuel quantity F thus equals the constant k multiplied by the volume signal V.

At the subsequent step 870, it is determined whether a crank angle theta equals the timing theta-2. If the determination is NO, the program proceeding to step 850 is delayed until it is YES.

At step 880, the peak value Vp, which is stored at the circuit 286, is read. Set forth below is this step explained with reference to FIGS. 18A and 18B.

When fuel is injected into the chamber 236, the volume therein increases sharply. In response thereto, the diaphragm 231 transmits for a certain period the damped vibration of a frequency peculiar to a fuel system which measures the fuel injection quantity. The vibration, the amplitude of which is maximum immediately after the injection, declines to a certain level corresponding to the crank angle theta-3.

Meanwhile, the circuit 286 stores only the peak value Vp of the volume signal V output from the transmitting part 255 (shown by an alternately long and short dashed line). The CPU thus only has to read the signal V in order to obtain the peak value Vp thereof from the circuit 286. The cycle of the vibration of the volume signal V is due not to the fuel injection quantity, but is peculiar to the measuring system.

The program next proceeds to step 890, where a maximum fuel quantity Fp in the fuel injection chamber 236 is computed in response to the signal Vp (Fp=k×Vp). At step 900, a maximum fuel quantity Fpn of relative difference from the zero point is computed (Fpn=Fp−F0), and will be used later in the program.

At step 910, it is determined whether the fuel injection frequency n is more than the initial fuel injection frequency IN. If the determination is NO, the program proceeds to step 920. Steps 920-990 (a process for setting L), are repeated in order to derive a constant L, which defines the maximum relative difference fuel quantity Fpn and a relative difference fuel quantity Fn representative of an actual injection quantity. Set forth below are the steps explained.

At step 920, it is determined whether a crank angle equals the crank angle theta-3. If the determination is NO, the program proceeding to step 930 is delayed until it is YES. At step 930, the stable state volume signal Vm, which corresponds to the crank angle theta-3, is read. At step 940, a fuel quantity Fm corresponding to the signal Vm is computed (Fm=k×Vm). At step 950, the quantity Fn is computed (Fn=Fm−F0). The program thereafter proceeds to step 960, where the ratio Ln corresponding to the n-th injection of the fuel quantity Fn to Fpn is computed (Ln=Fpn/Fn). At step 970, the constant L which is the average of the ratio Ln for each ratio corresponding to an injection, from the first to the n-th, is computed $$\left( L = \sum_{i=1}^{N} Li/n \right).$$

Set forth below are steps 960 and 970 explained in detail.

Fpn is determined by the calculation according to the following equations:

$$Fpn = Fn - Fn \times M \times \exp(-\alpha \times tp) \times \sin(\beta \times tp + \phi)$$

$$\sin(\phi) = \beta/\sqrt{\alpha^2 + \beta^2} = 1/M$$

where alpha and beta are constants peculiar to the measuring system, and tp is set at a minimum value exceeding zero, satisfying the following:

$$\sin(\beta \times tp + \phi) = -1.$$

The ratio Ln is peculiar to the measuring system, without any influence by the fuel injection quantity. Nonetheless, the average thereof is computed in case of an erroneous measurement at step 970.

After step 970, the program proceeds to 980, where the fuel quantity Fn is output on the CRT display 270.

At step 990, it is then determined whether a crank angle equals the crank angle theta-4. If the determination is N, the program proceeding is delayed until it is YES.

If, on the other hand, the determination is YES at step 910, the steps 1050–1070 are executed. At step 1050, the fuel quantity Fn is derived from the fuel quantity Fpn divided by the constant L each having been computed respectively at step 900 and the process for setting L. At step 1060, the fuel quantity Fn, which represents the actual fuel injection quantity, is output on the CRT display 270. At step 1070, it is determined whether a crank angle equals the crank angle theta-5. If the determination is NO, the program proceeding is delayed until it is YES.

After either steps 920–990 or steps 1050–1070, the program proceeds to step 1000, where the fuel is discharged by the quantity responsive to that in the fuel injection chamber 236 at the timing of either theta-4 or theta-5.

At step 1010, the peak hold circuit 286 is reset to store another peak value of the volume signal V received from the transmitting part 255. At step 1020, it is determined whether the actual fuel injection frequency is more than the predetermined one, N. If the determination is NO, the program returns to step 830, and the measurement is repeated. If, on the other hand, the determination is YES, the program is terminated.

Set forth below are the advantages offered by the sixth embodiment, except those similar to the first embodiment.

The measuring device according to the present embodiment computes a fuel injection quantity in response to the peak value Vp of the volume signal after the process for setting L (steps 920–990), as shown in FIGS. 18A and 18B. It is thus unnecessary to delay the computation of another injection quantity against the hunting of the volume signal V due to the injection until a volume signal V becomes stable at the predetermined level (the crank angle theta-3). It achieves accurate measurement of the fuel injection quantity in the case of a pump driven at high speed (more than 3000 rpm).

The measuring device starts measuring a fuel injection quantity immediately after a fuel injection is completed. It is thus possible to measure with quick response the fuel injection quantity in the fuel injection pump VE of a diesel engine driven at high speed. It also enables easy measurement of a varying fuel injection quantity due to a rough engine, and for the quick adjustment of the fuel injection pump VE.

The pressure in the back pressure chamber 237 also is easily variable, whereby it is possible to have the pressure in the fuel injection chamber 236 as a condition under which an injection quantity is measured. It thus offers a substantially accurate measurement.

It will be understood that the device may be structured to read the peak value Vp of the volume signal by the program by using the CPU 271, instead of using the peak hold circuit 286 of the present embodiment.

Figure 19:
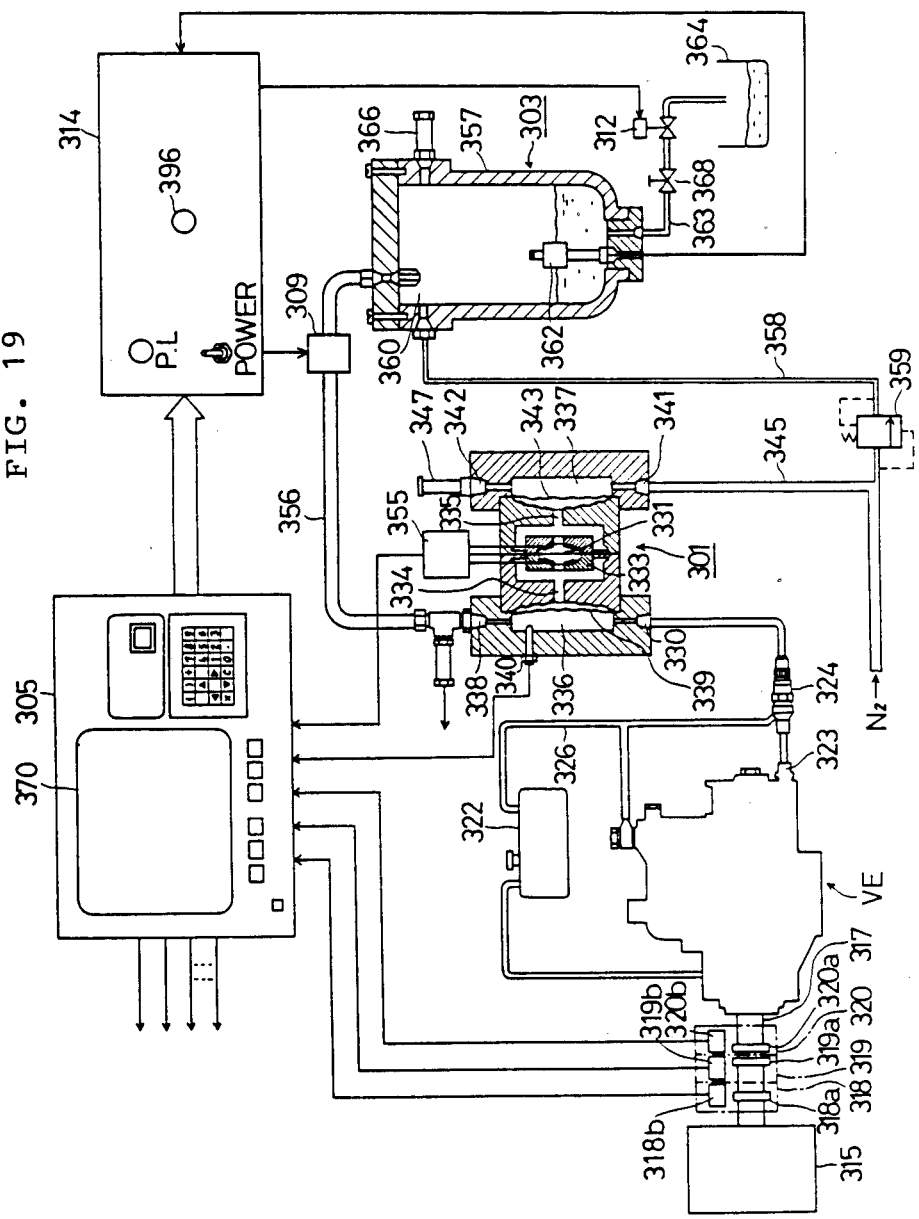
FIG. 19 is a schematic view of a measuring device for measuring a fuel injection quantity in a seventh embodiment according to the present invention.

Referring now to FIG. 19, there is shown a system of a seventh embodiment. The structure thereof is identical to that of the second embodiment with the exception that the throttle valve 309 is provided for the discharge pipe 356, through which the fuel injection chamber 336 is connected to the discharge receiving vessel 357. As for the construction of the diaphragm chamber, FIG. 2 will be used as a reference.

The throttle valve 309 is a needle valve including a stepping motor therein. It is structured to receive a signal from the valve control unit 314, thereby adjusting accurately the lifting quantity of the needle, that is, the opening area thereof. It will be understood that the valve 309 adjusts the fluid flow, which is discharged from the fuel injection chamber 336 to the discharge receiving vessel 303 via the pipe 356 and a discharge nozzle 338.

Figure 20:
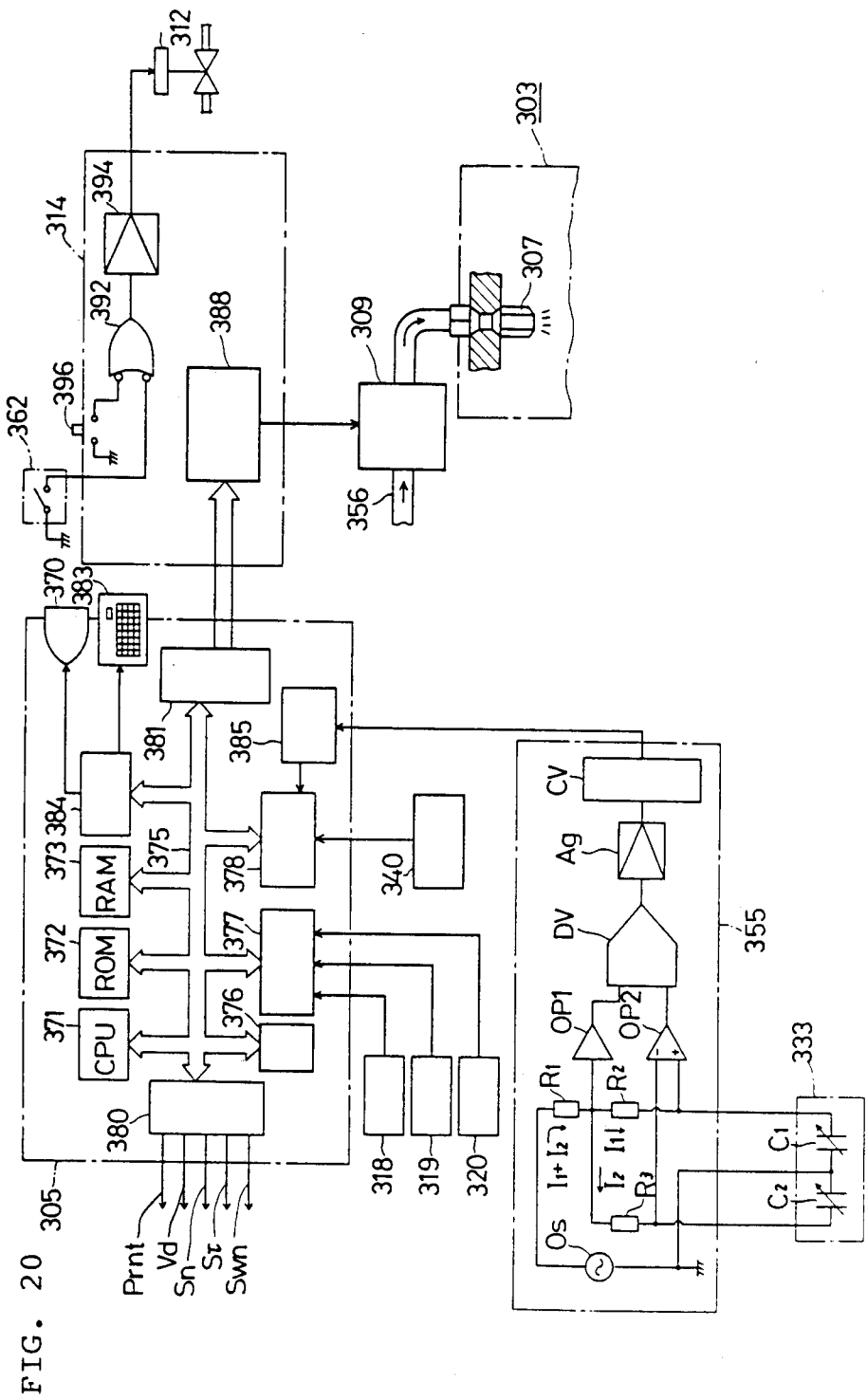
FIG. 20 is a block diagram which shows an electric system of the seventh embodiment.

Referring to FIG. 20, there is shown an electric system of the present embodiment, which is similar to that of the second embodiment. In the seventh embodiment, 100 is added to the numeral of each corresponding element.

Figure 21A:
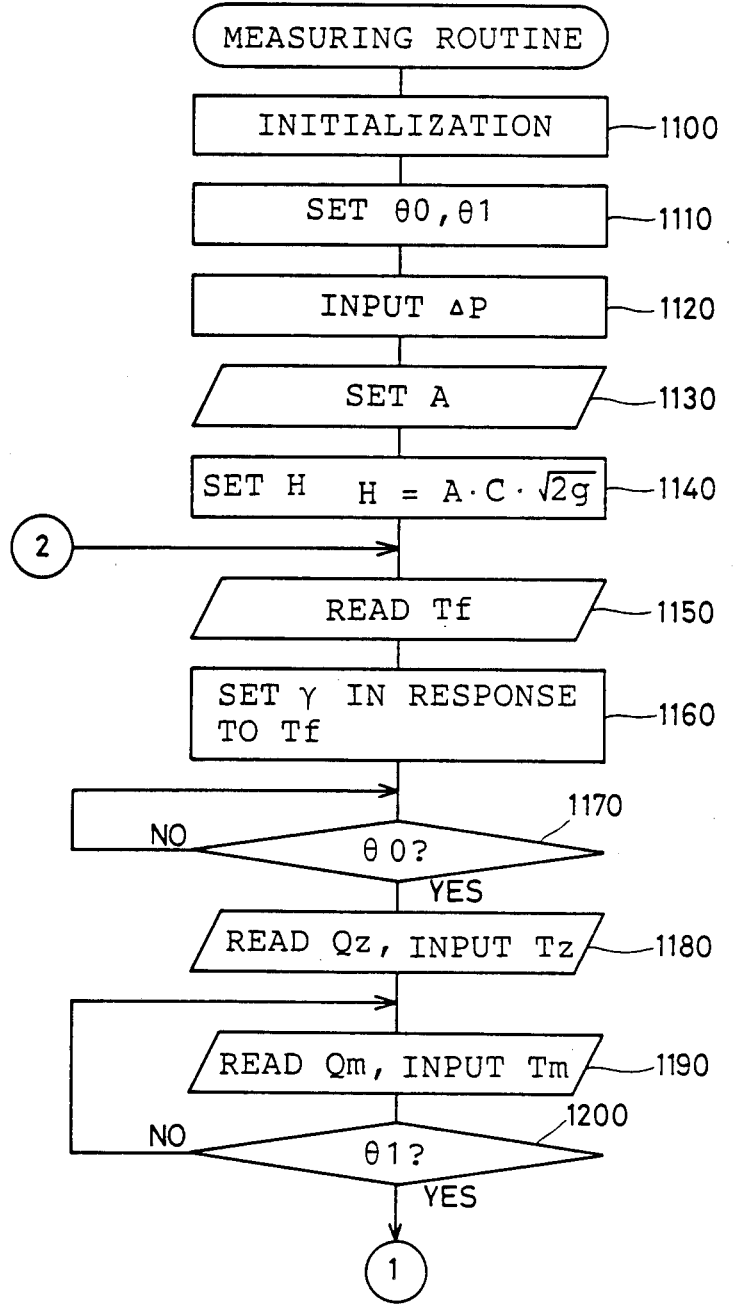
FIGS. 21A and 21B are flow charts which show a routine for measuring and controlling the fuel injection quantity at a measuring and controlling part according to the seventh embodiment.
Figure 21B:
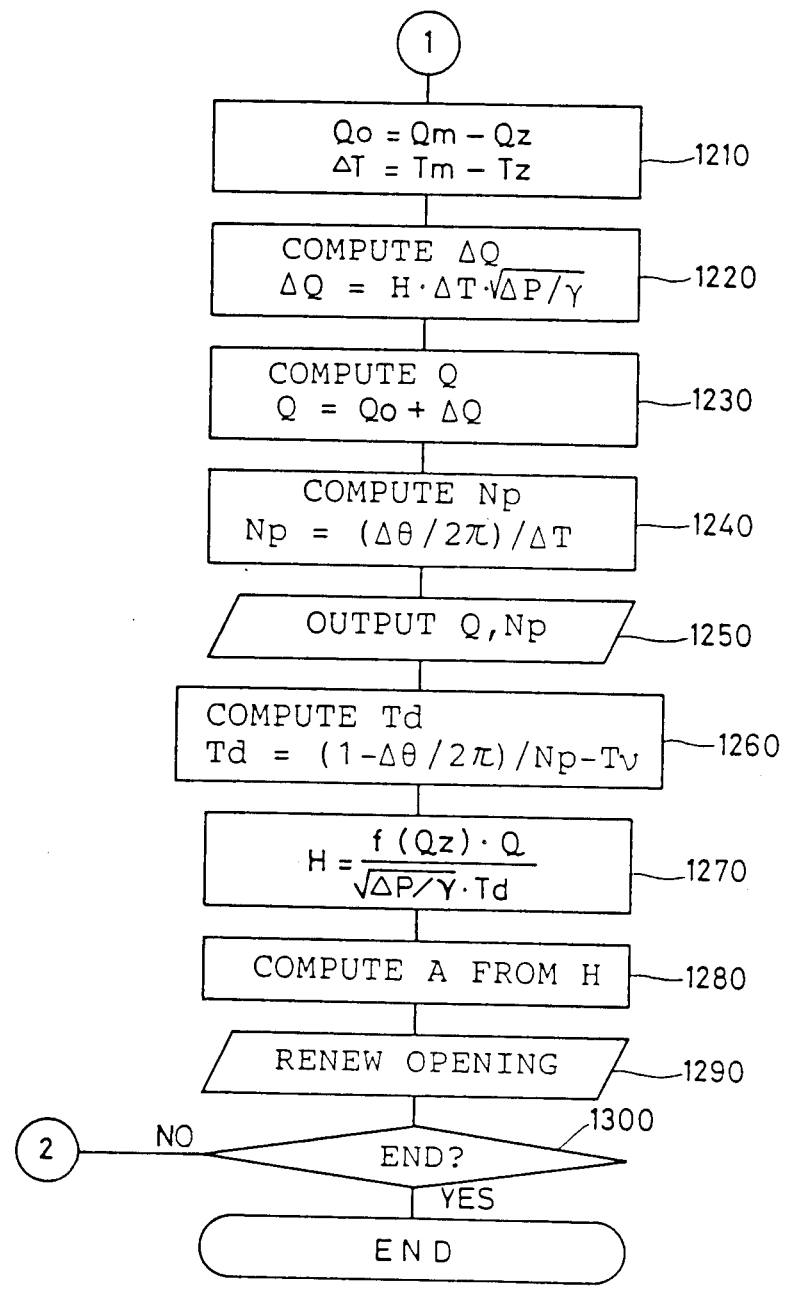

Referring now to FIGS. 21A and 21B, explanation follows of the control process steps managed by the measuring and controlling part 305. The program begins with step 1100 in response to power supply. At step 1100, initialization such as clearing the CPU 371 is executed. At step 1110, cam angles theta-0 and theta-1 are set. In response to the cam angle theta-0, th displacement of the diaphragm 331 before a fuel injection is read as a zero point. In response to the cam angle theta-1, the fuel injection quantity after the injection is measured.

When the motor 315 is activated, the fuel injection pump VE is driven, and the measurement begins. Permitting the throttle valve 309 to discharge fuel, with an opening set at a default value, the regulating part 305 displays on the CRT display 370 the displacement of the diaphragm 331, which is input by the transmitting part 355. The varying displacement of the diaphragm 331 is plotted as a graph with a crank angle of 0°–720° as an abscissa. With reference thereto, an operator, using a keyboard panel 383, defines crank angles immediately before and after a fuel injection as the cam angles theta-0 and theta-1, respectively.

At the subsequent step 1120, a pressure differential delta-P of the throttle valve 309, that is, an adjusted value of a differential pressure regulator 359, is also input by means of the keyboard panel 383. At step 1130, the opening A of the valve 309 is converted from a default value to an initial value, in response to the pressure differential delta-P, via the output port 381 and a drive unit 314.

At step 1140, a correction coefficient H is set in response to the opening A, which is set at the foregoing step, with reference to a table stored in the ROM 372. The table is based on the following equation:

$$H = A \times C \times \sqrt{2g} \quad (14)$$

where C represents a flow coefficient responsive to the shape of the opening of the valve 309, and g represents a gravitational acceleration. The coefficient H, hereinafter referred to, is used for adjusting the opening.

At step 1150, a fuel temperature Tf is read from a fuel temperature sensor 340 via an analog input port 378. The temperature Tf determines a specific gravity gamma of fuel. At step 1160, the specific gravity gamma of fuel is thus set in response thereto, with reference to a table.

A step 1170, it is determined whether a crank angle equals the cam angle theta-0. The crank angle is sensed in response to a timing TDC representative of a top dead center position, which is input from the TDC sensor 320 in the pulse input port 377, with reference to a speed signal N, which is input from the speed sensor 318 at every 30° CA. If the determination is YES, the program proceeds to step 1180, where the zero point and a time point Tz from a timer 374 is read. A volume Qz in the chamber 336 immediately before the fuel injection is read as the zero point for measuring an injection quantity to eliminate measuring errors due to various drifts of a measuring system and an erroneous initial position of the diaphragm.

The program then proceeds to step 1190 where, sequentially, a volume Qm in the chamber 336 is computed in response to the displacement of the diaphragm 331, and a time point Tm is input from the timer 374. At step 1200, it is determined whether a crank angle equals the cam angle theta-1. If the determination is NO, step 1190 is repeated until it is YES. The change of the displacement of the diaphragm 331 and a time point is measured and input sequentially, until the fuel injection is then completed and another fuel injection quantity is computed.

While the displacement of the diaphragm 331 is read via the analog input port 378, a displacement signal input by the transmitting part 355 is proportional to $(C1-C2)/(C1+C2)$. C1 and C2 represent the capacitance between the diaphragm and either an electrode 351 or 352, respectively, each being derived from the following equations:

$$C1 = \text{epsilon} \times B/(d0 - \text{delta} - d) \quad (15)$$

$$C2 = \text{epsilon} \times B/(d0 + \text{delta} - d) \quad (16)$$

where B, epsilon, d0, and delta−d represent respectively the area of either the electrode 351 or 352, the dielectric constant of the silicon oil in the diaphragm chamber 333, the average of the value between the diaphragm 331 and either the electrode 351 or 352, and the displacement of the diaphragm 331 responsive to the fuel injection quantity.

From the foregoing equations (15) and (16), the following is obtained:

$$\text{delta} - d/d0 = (C1-C2)/(C1+C2) \quad (17)$$

Since the distance d0 is constant, it will thus be understood from the equation (17), that the volume signal V output from the transmitting part 355 corresponds to the displacement delta−d of the diaphragm 331.

Figure 22:
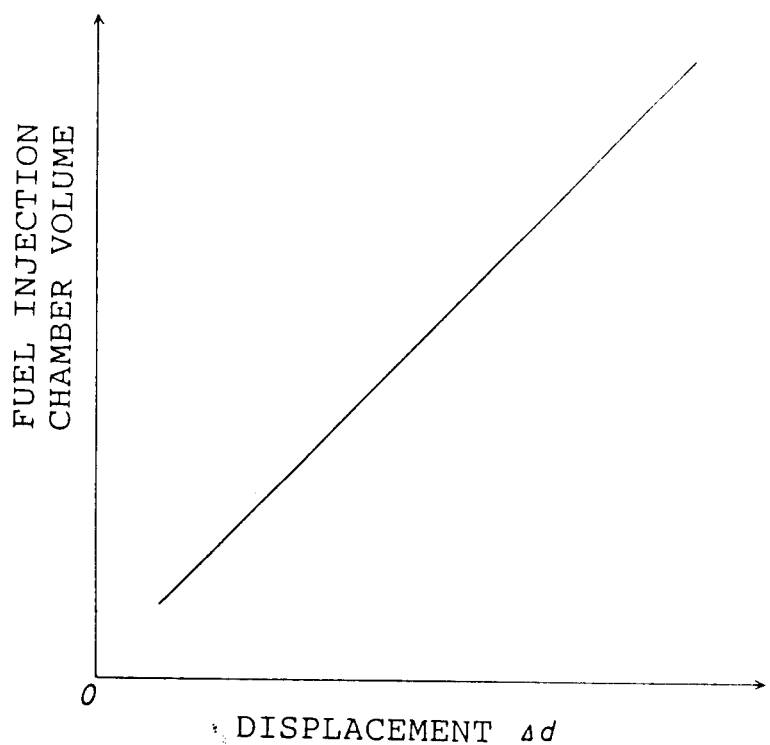
FIG. 22 is a graph which shows the relationship between a displacement of the diaphragm delta−d and the volume of a fuel injection chamber according to the seventh embodiment.

Further, an experiment verifies, as shown in FIG. 22, that the fuel quantity Qm in the fuel injection chamber 336 is proportional to the displacement delta−d of the diaphragm 331 in the present embodiment. The fuel quantity F equals K3 (coefficient) multiplied by the displacement delta−d, which is responsive to the volume signal V. The fuel quantity F thus equals the constant k multiplied by the volume signal V.

If the determination is YES at step 1200, the program proceeds to further steps beginning with step 1210, where an actual fuel injection quantity Q and the control degree of the valve 309 responsive thereto are computed.

At step 1210, the change Q0 of the volume in the fuel injection chamber 336 and a measuring time interval delta-T are computed according to the following equations, respectively:

$$Q0 = Qm - Qz$$

$$\text{delta} - T = Tm - Tz$$

At step 1220, a discharge delta-Q is computed according to the following equation:

$$\text{delta-}Q = H \times \text{delta-}T \times \sqrt{\text{delta-}P/\text{gamma}}$$

Since fuel is discharged from the chamber 336 to the discharge receiving vessel 303 via the valve 309, during the injection as well as thereafter, the fuel discharged therefrom during the time interval delta-T is computed at that step.

At step 1230, the actual fuel injection quantity Q is computed by adding the change Q0 of the volume in the chamber to the discharge delta-Q, each having been derived at steps at 1210 and 1220, respectively. At step 1240, the speed Np of the fuel injection pump VE is computed according to the following equation:

$$Np = (\text{delta} - \text{theta}/2 - \text{pi})/\text{delta} - T$$

where delta-theta represents the differential between the cam angles theta-1 and theta-0 (theta-1−theta-0). At step 1250, the speed Np and the actual quantity Q are output to the CRT display 370 and an external host computer.

At step 1260, according to the following equation, is computed a discharge time interval Td, during which a fuel is discharged from the fuel injection chamber 336 to the vessel 303, without fuel injection:

$$Td = (1 - \text{delta} - \text{theta}/2 - \text{pi})/Np - T - nu$$

where T−nu represents a time interval, during which the CPU 371 operates the above. The time interval is used in order to make the time interval Td more effective.

At step 1270, the coefficient H is computed. The coefficient H, the initial value of which has been set at step 1140, is computed again in order to derive the opening A, in response to the actual fuel injection quantity Q and the discharge time interval Td. The operation therefor is as follows:

$$H = \{f(Qz) \times Q\}/(\sqrt{\text{delta-}P/\text{gamma}} \times Td)$$

where f(Qz) represents a compensation coefficient, which is determined by the volume Qz in the chamber 336 corresponding to the cam angle theta-0. The coefficient f(Qz) compensates the coefficient H when the volume Qz before the injection changes during a long measurement.

The program next proceeds to step 1280, where the opening A of the throttle valve 309 is derived in response to the coefficient H, with reference to a table. At step 1290, an opening thereof is controlled via the output port 381, whereby within the time interval Td, the fluid discharged to the vessel 303 via the valve 309 is adjusted to such an quantity as to restore the volume in the fuel injection chamber 336 to that before the injection.

At step 1300, it is determined whether the measurement is to be terminated. The determination depends on, for example, whether a key is operated. If the determination is NO, the program returns to step 1150, and steps 1150–1300 are repeated. If, on the other hand, the determination is YES, the measuring routine is terminated.

It will be understood, that synchronously with the measurement of the actual fuel injection mount Q, the routine controls the opening of the throttle valve 309 to such a degree that the discharge coincides with the fuel injection quantity within one cycle of the fuel injection. This is clearly shown in FIGS. 23A–23C.

Set forth below are the advantages offered by the seventh embodiment.

Maintaining the pressure in the fuel injection chamber 336 as much as that in the back pressure chamber 337, the measuring device according to the present embodiment injects fuel by the quantity which is derived from the change Q0 of the volume in the chamber 336 responsive to the displacement of the diaphragm 331, and from the discharge delta-Q within the time interval delta-T. Thus accurate (e.g. within $\pm 0.1$ mm$^3$) and wide ranging (e.g. 0–100 mm$^3$) measurement is achieved.

Further, the measuring device has the structure, in which the throttle valve 309 is precisely controlled in a manner such that the discharge coincides with the fuel injection quantity within one cycle of the fuel injection, whereby it starts measuring a fuel injection quantity immediately after a fuel injection is completed. It is thus possible to measure with quick response the fuel injection quantity in a fuel injection quantity VE of a diesel engine driven at high speed. It enables the easy measurement of a varying fuel injection quantity due to a rough engine, and allows for quick adjustment of the fuel injection pump VE. Moreover, the pressure in the back pressure chamber 337 is easily variable, whereby it is possible to have the pressure in the overflow pipe 336 as a condition under which the injection quantity is measured. It thus offers a substantially accurate measurement.

Figure 25:
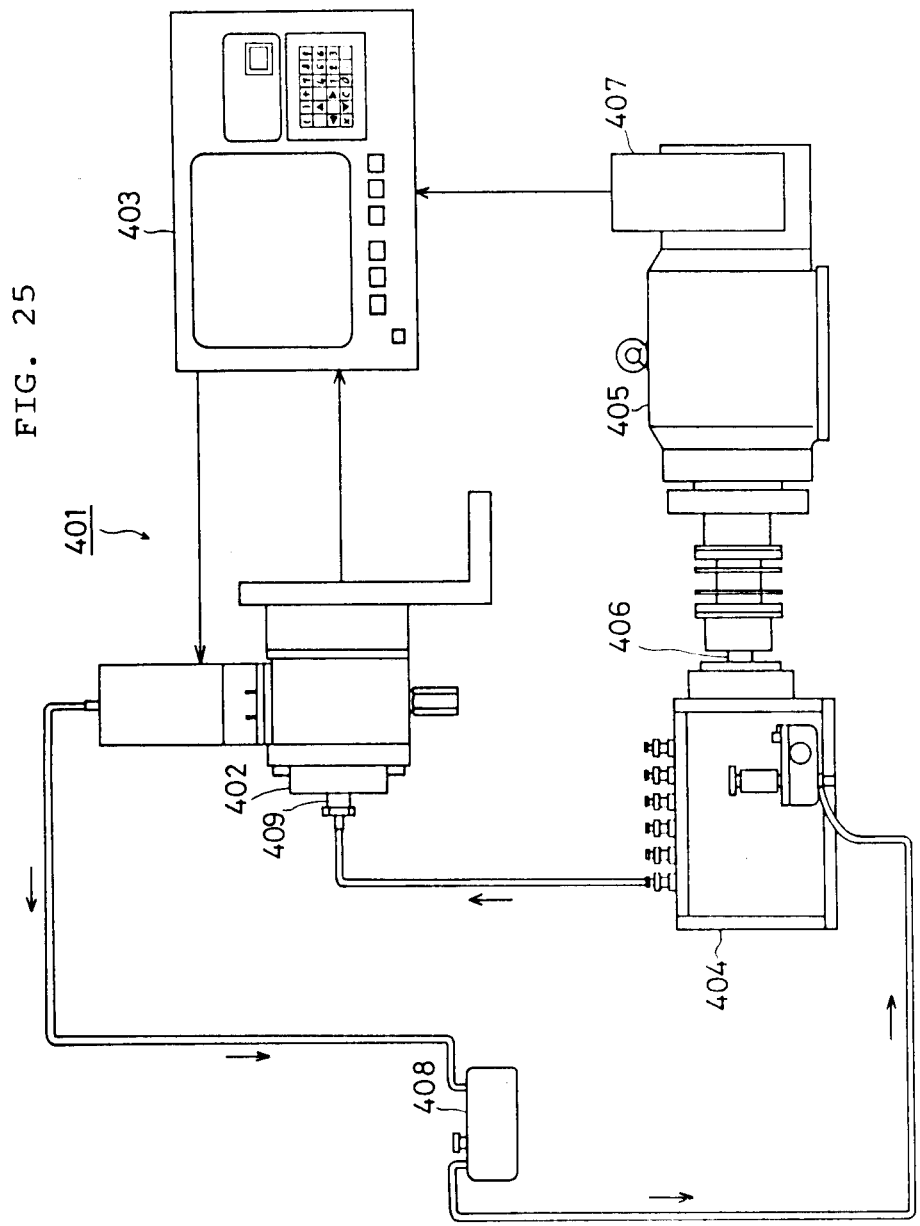
FIG. 25 is a system diagram of the eighth embodiment.

Referring now to FIG. 25, there is shown a system of an eighth embodiment. A measuring device for measuring a fuel injection quantity 401 comprises mainly the sensing part 402 and the regulating part 403. A fuel injection pump used for the measurement is one for a diesel engine, and it is fixed upon a measuring bench. A motor 405, which is connected to a drive shaft 406 instead of a diesel engine as drive source in practical use, includes at its rotation shaft an angle sensor 407 for providing a speed signal, a valve detecting signal, and a top dead center signal, to the regulating part 403.

The fuel injection pump 404 receives fuel from the fuel tank 408, and sends it to the fuel injection valve 409 under pressure. FIG. 25 shows only one system for a plurality of provided valves.

The sensing part 402 outputs a signal to the measuring and controlling part 403 and vice versa. The former is an injection quantity signal responsive to a fuel injection quantity from the valve 409, and the latter is a drive signal, in response to which the sensing part 402 discharges the fuel injected thereto, the discharged fuel flowing into the fuel tank 408.

Figure 24:
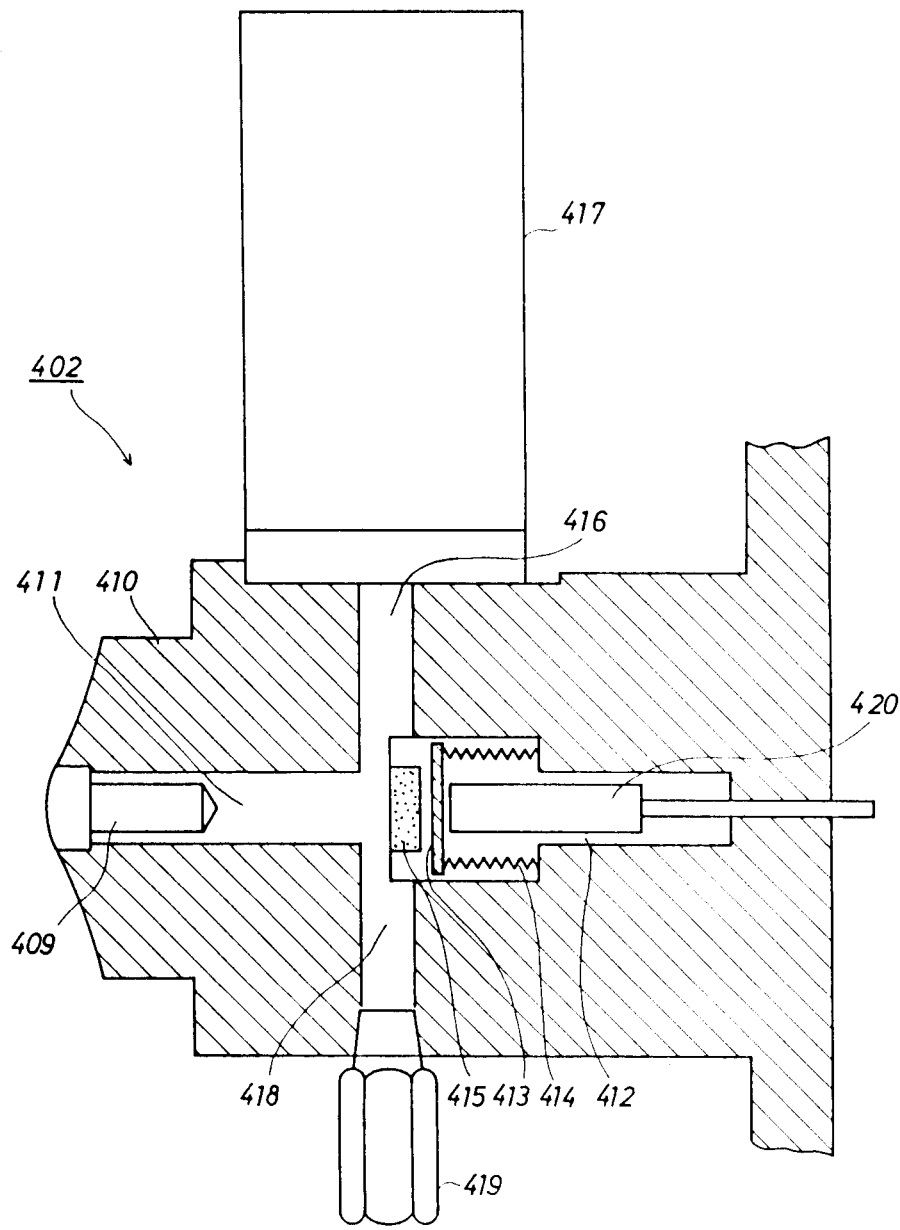
FIG. 24 is a partially sectional view of a detector of an eighth embodiment according to the present invention.

Referring now to FIG. 24, there is shown a structure of the sensing part 402. The part 402 includes within a housing 410 a fuel injection chamber 411 having the valve 409 and a back pressure chamber 412 opposed thereto. The chambers 411 and 412 are disconnected from each other by barriers of an iron-made disc plate 413 and an iron-or-plastic-made bellows 414. The bellows 414 is further elastic due to its structure, thereby generating a pressure (about 200 [KPa]) which works as the back pressure from the back pressure chamber 412 to the fuel injection chamber 411 upon injection. Within the chamber, a buffer agent 415 is provided near the disc plate 413. The buffer agent 415 is made of porous material such as sintered metal or ceramics having a hole.

The fuel injection chamber 411 is further connected to the discharge valve 417 as a discharge means and to the safety valve 419 via first and second passages 416 and 418, respectively. The discharge valve 417 is a solenoid valve, which opens in response to the excitation by the measuring and controlling part 403, thereby discharging fuel in the fuel injection chamber 411. The safety valve prevents the pressure therein from increasing sharply by relieving itself when it exceeds a predetermined working pressure.

Within the back pressure chamber 412, there is fixed by a casing (not shown), a non-contact displacement sensor 420, which provides to the regulating part 403 the injection signal representative of the displacement of the disc plate 413 due to shrinkage of the bellows 414. The displacement sensor 420 is of a high-frequency oscillating type having a detection coil, the inductance and loss of which varies by electromagnetic induction when metallic material (the disc plate 413 in the present embodiment) approaches thereto.

Set forth below is an explanation of the operation during the measurement of a fuel injection quantity.

With the valves 417 and 419 closed, the fuel is injected from the valve 409 to the chamber 411, the back pressure of which is maintained at a predetermined level. The injection causes an impulse force therein, nonetheless being reduced by the buffer agent 415. It will be thus understood, that when the fuel is injected, the increase of the pressure in the chamber 411 is quickly eased, the volume therein increasing in response to the quantity thereof. Due to the increase of the volume, the disc plate 413 compresses the chamber 412. The bellows accordingly shrinks, with the plate 413 moving to the position corresponding to the increase of the volume, the quantity of which is sensed by the displacement sensor 420.

Figure 26:
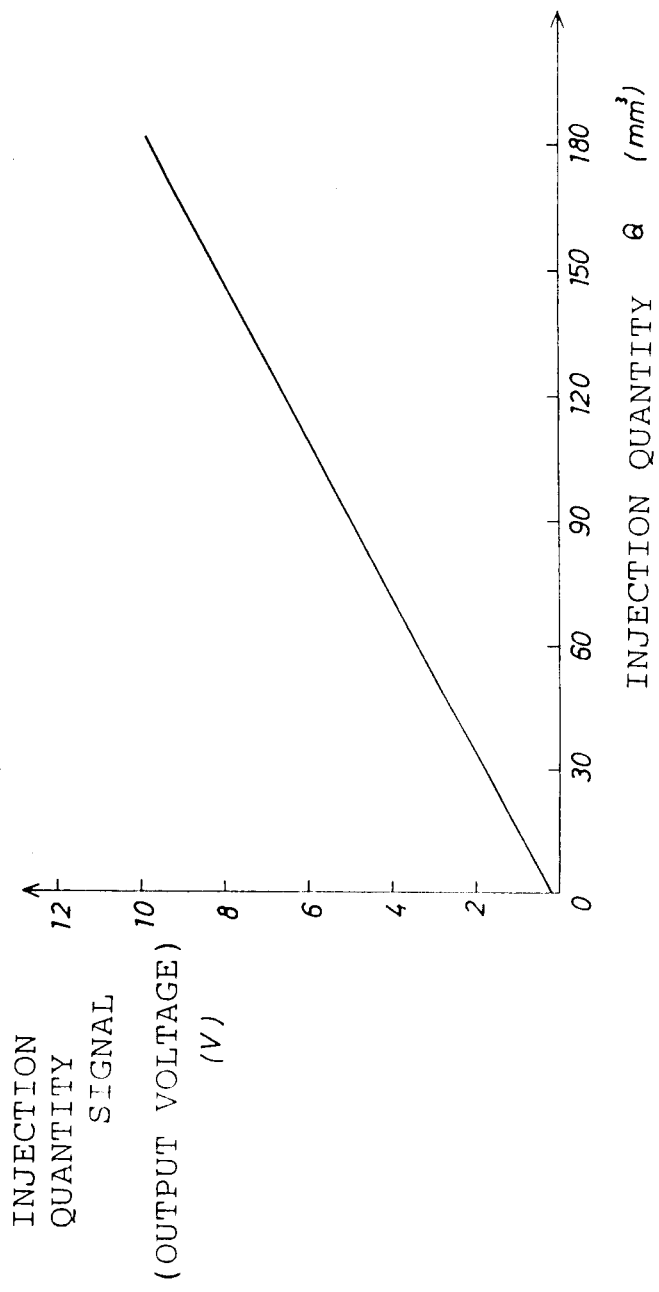
FIG. 26 is a graph which shows the relationship between a fuel injection signal S tau and a fuel injection quantity according to the eighth embodiment.

An experiment verifies, as shown in FIG. 26, that the injection quantity signal is proportional to a fuel injection quantity. The regulating part 403 thus computes the fuel injection quantity in response to the injection signal with reference to a table. The discharge valve 417 opens thereafter in response to the drive signal output from the regulating part 403, whereby fuel is discharged by the measured quantity from the chamber 411. The volume therein decreases to the initial volume before starting the measurement, the disc plate 413 returning to the initial position due to the pressure thereto from the bellows.

Figure 27:
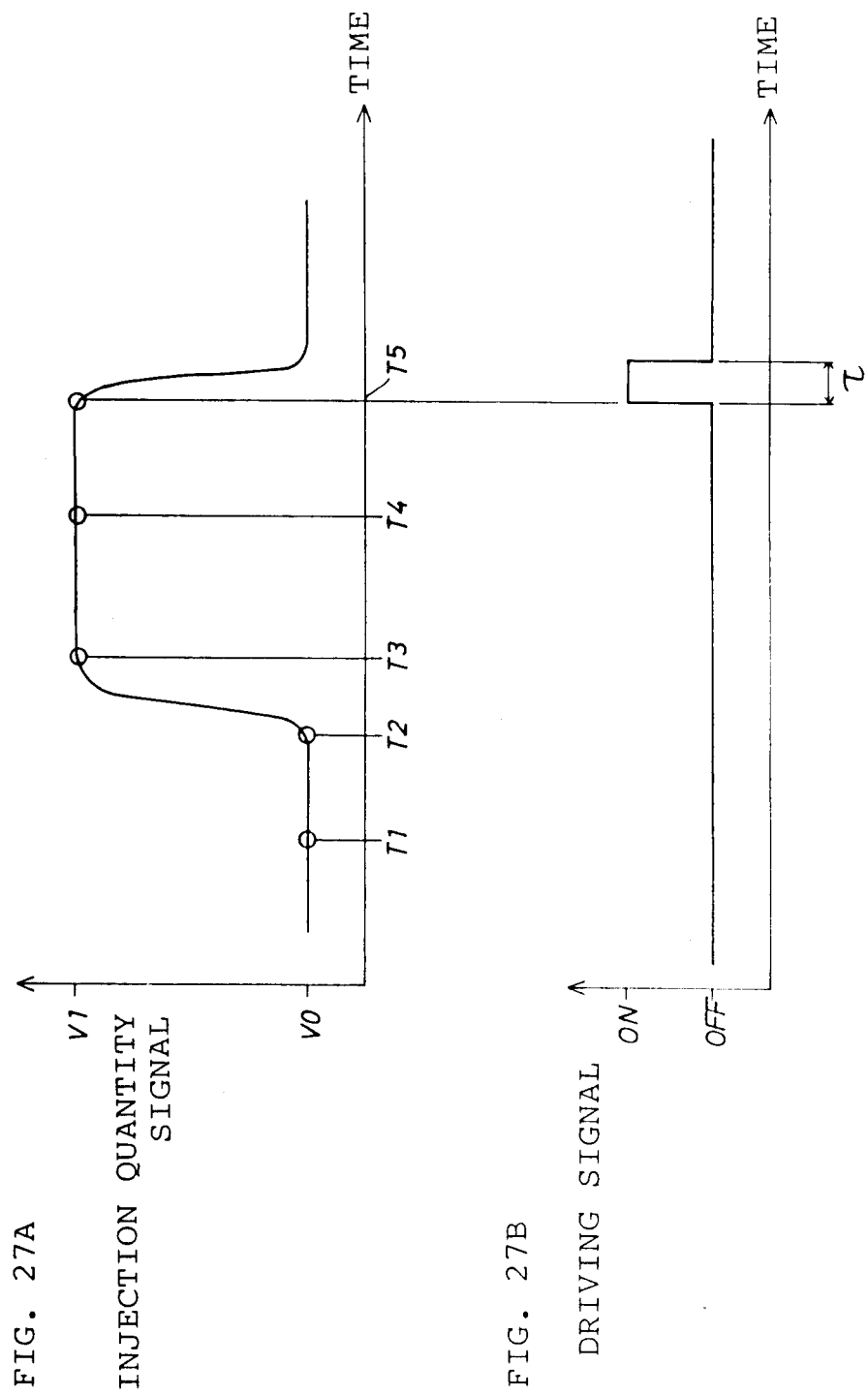
FIGS. 27A and 27B are timing charts of the eighth embodiment.
Figure 28:
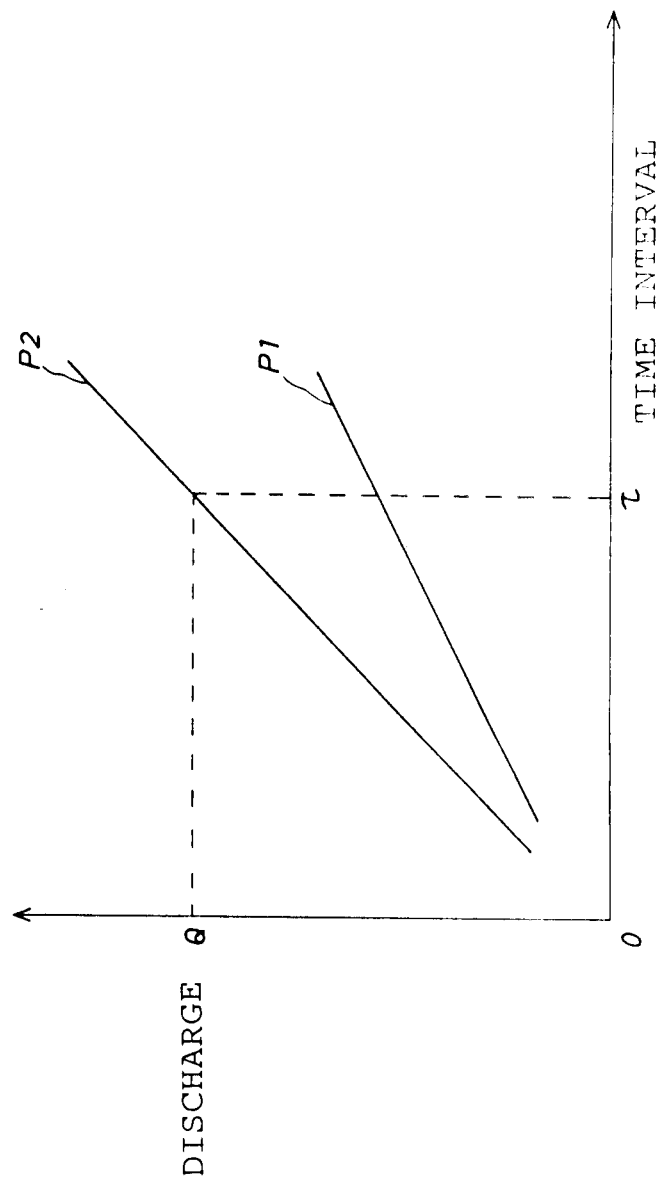
FIG. 28 is a graph which shows the relationship between a displacement of discharge valves and the opening hour according to the eighth embodiment.

Referring now to FIGS. 27A and 27B, explanation follows of one example of the measuring control. At a time point T1, when fuel has not been injected yet, a reference signal V0 is provided. From time points T2 to T3, fuel is injected, the signal representative thereof increasing in value. At a time point T4, an injection quantity signal V1 corresponding to fuel injection thereat is provided. An actual injection quantity signal S representative of the differential between the signals V1 and V0 corresponds to the actual injection quantity. The valve 417 is then opened for a time interval tau from a time point T5, which is after measurement of the fuel injection quantity. Fuel of predetermined quantity is then discharged in response to the pressure differential between an inlet and an outlet of the valve 417, as shown in FIG. 28. The time interval tau is determined by the regulating part 403 to be such a duration that the discharge will coincide with the injection quantity having been measured.

A routine of fuel injection, measurement of the quantity thereof, and discharge is repeated thereafter. It will be understood, that cumulative fuel from a predetermined number of times of injection may be discharged, instead of discharging at every injection as mentioned above.

Set forth below are the advantages offered by the eighth embodiment.

Fuel injection quantity is computed in response to the displacement of the disc plate 413 due to the shrinkage of the bellows 414. Long-interval (0.1–200 mm$^3$/stroke) measurement with quick response of 60–80 [Hz] is thus achieved.

Fuel injection quantity is further computed in the fuel injection chamber 411 which is of relatively small volume due to the buffer agent 415, which makes it possible to miniaturize the sensing part 402.

The foregoing quick response offers the measurement at every cycle. Still, a measurement with high accuracy (e.g. within ±0.1 mm$^3$) is realized. The actual injection signal S representative of the differential between the signals V0 and V1 is used upon measuring. Thus, the change of the reference voltage of the displacement sensor 420 or the erroneous initial position of the disc plate 413 and the bellows 414 is counterbalanced.

Since a plurality of sensing parts is provided, each having the identical structure as the part 402 explained hereinabove, a fuel injection quantity corresponding to a plurality of cylinders is synchronously measured.

The determination analysis of the action taken by the fuel injection pump under an excessive driving condition is thus realized. The variance of a fuel injection quantity, which is caused by a rough engine, is also easily measured, and efficiency of the adjusting work of the fuel injection pump is enhanced.

Though the device according to the present embodiment is for measuring a fuel injection quantity of the fuel injection pump provided for a diesel engine, it is also available for that of the fuel injection valve provided with a gasoline engine.

Figure 29:
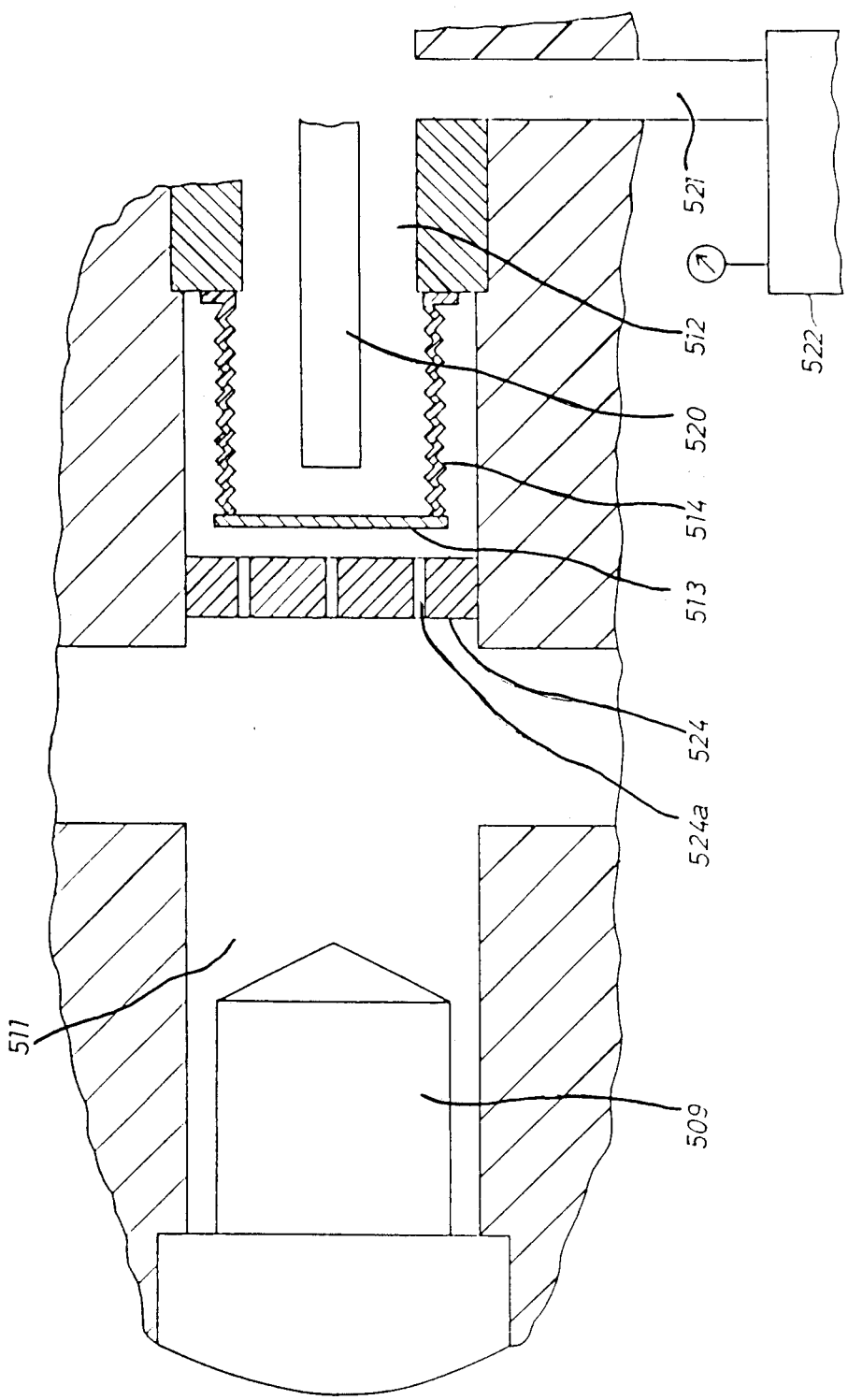
FIG. 29 is a partially sectional view of a modification according to the eighth embodiment.

It will be understood that other structures could also be introduced. One such alternative structure is shown in FIG. 29. A measuring device includes a plate 524 having an aperture 524a as the buffer agent 524, instead of the buffer agent 515 of the present embodiment, which is made of porous material. It further includes the constant pressure chamber 522 having, selectively, a relief valve or a differential pressure regulator as a substitution for the bellows 414 to maintain back pressure. A back pressure chamber 512 is connected via a third passage 521 to the constant pressure chamber 522, which is filled with nitrogen gas (N$_2$) of a constant pressure, whereby the back pressure is generated. The measuring device structured as above has the additional advantage to the foregoing that it selectively fixes the back pressure and varies it as a condition for measurement.

Another alternative structure is shown in FIG. 30. A displacement sensor 620 is provided at such a position that the output thereof changes in response to the displacement of the disc plate 613. Further, a correction sensor 625 having the identical structure to that of the sensor 620 is provided at such a distance from the disc plate 613 that the output thereof does not change as in the foregoing case.

This structure enables accurate measurement against widely changing ambient temperatures by correcting the errors due thereto. Referring to FIG. 31, for example, there is shown the relationship between the voltage output from the sensors 520 and 525 and temperature. As the voltage output from the displacement sensor 520 (shown by a solid line) changes, that from the correction sensor 525 (shown by a broken line) also changes in response to the temperature. The errors due to the changing temperature are thus counterbalanced, if the fuel injection quantity is measured in response to the differential (shown by an alternately long and short dashed line) therebetween.

While the invention has been described in detail with particular reference to preferred embodiments thereof, it will be understood that variations and modifications can be effected within the spirit and scope of the invention as described hereinbefore and as defined in the appended claims.

What is claimed is:

1. A measuring device for measuring a fuel injection quantity, comprising:
   fuel volume sensing means including a fuel injection chamber connected to a fuel injection valve and receiving said fuel injection quantity therefrom, a back pressure chamber which faces said fuel injection chamber, bulkhead means located between said fuel injection chamber and said back pressure chamber as an intercept therebetween and responsive to said fuel injection quantity for generating a displacement, sensing means for sensing said displacement of said bulkhead means, and pressure means for holding a pressure of the back pressure chamber to be of a constant value,
   fuel injection quantity computing means responsive to said sensing means for determining a fuel injection quantity,
   discharging means including fuel discharging means for discharging said injected fuel quantity from said fuel injection chamber to its exterior, discharging quantity computing means responsive to said fuel injection quantity computing means for computing a discharged quantity, and discharge control means responsive to said discharging quantity computing means for controlling said fuel discharging means so as to control said discharged quantity.

2. The measuring device for measuring the fuel injection quantity according to claim 1 wherein said bulkhead means has a diaphragm and has a highly insulated fluid enclosed therein.

3. The measuring device for measuring a fuel injection quantity according to claim 1 wherein said sensing means is a sensor not contacting with said bulk means.

4. The measuring device for measuring the fuel injection quantity according to claim 1 wherein said sensing means is an electrical capacitance sensor for measuring said displacement.

5. The measuring device for measuring the fuel injection quantity according to claim 1 wherein said sensing means is an eddy current sensor for measuring said displacement.

6. The measuring device for measuring the fuel injection quantity according to claim 1 wherein said pressure means is a constant pressure gas chamber communicative with said back pressure chamber.

7. The measuring device for measuring the fuel injection quantity according to claim 1 wherein said fuel injection chamber has a buffer member with an access hole at a predetermined position near said back pressure chamber.

8. The measuring device for measuring the fuel injection quantity according to claim 1 wherein said bulkhead means is a bellows having a base portion attached to said back pressure chamber and a free end provided in said fuel injection chamber.

9. The measuring device for measuring the fuel injection quantity according to claim 8 wherein said bellows serves as said pressure means by the elastic deformation thereof.

10. The measuring device for measuring the fuel injection quantity according to claim 1 wherein said fuel injection quantity computing means includes means for computing said fuel injection quantity in response to a difference between a first signal representative of said displacement before said fuel injection and a second signal representative of said displacement after said fuel injection.

11. The measuring device for measuring the fuel injection quantity according to claim 1 wherein said exterior of said discharging means is a discharged chamber and said discharging means is a discharging valve provided in a path connecting said fuel injection chamber to said discharged chamber, thereby allowing said injected fuel expelled from said fuel injection chamber to enter said discharged chamber.

12. The measuring device for measuring the fuel injection quantity according to claim 11 wherein said discharging means includes means for connecting said back pressure chamber to said discharged chamber and holding a pressure of said discharged chamber toward a predetermined value less than said pressure of said back pressure chamber.

13. The measuring device for measuring the fuel injection quantity according to claim 1 wherein said discharging quantity computing means includes means for correcting said fuel injection quantity of said fuel injection quantity computing means in response to a first signal representative of said displacement before said fuel injection.

* * * * *